(12) United States Patent
Adya et al.

(10) Patent No.: US 7,680,767 B2
(45) Date of Patent: Mar. 16, 2010

(54) MAPPING ARCHITECTURE WITH INCREMENTAL VIEW MAINTENANCE

(75) Inventors: Atul Adya, Redmond, WA (US); Jose A. Blakeley, Redmond, WA (US); Per-Ake Larson, Redmond, WA (US); Sergey Melnik, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 316 days.

(21) Appl. No.: 11/725,206

(22) Filed: Mar. 16, 2007

(65) Prior Publication Data

US 2007/0226196 A1     Sep. 27, 2007

Related U.S. Application Data

(60) Provisional application No. 60/785,672, filed on Mar. 23, 2006.

(51) Int. Cl.
G06F 7/00      (2006.01)
G06F 17/00     (2006.01)
G06F 17/30     (2006.01)

(52) U.S. Cl. .......................... 707/2; 707/100; 707/102
(58) Field of Classification Search ................ 707/1–4, 707/100–102, 103, 104.1, 200, 103 R
See application file for complete search history.

(56) References Cited

U.S. PATENT DOCUMENTS

| | | | | |
|---|---|---|---|---|
| 5,504,885 | A * | 4/1996 | Alashqur | 717/141 |
| 5,907,846 | A * | 5/1999 | Berner et al. | 707/103 R |
| 6,058,391 | A | 5/2000 | Gardner | 707/4 |
| 6,175,837 | B1 * | 1/2001 | Sharma et al. | 707/103 Y |
| 6,421,658 | B1 * | 7/2002 | Carey et al. | 707/2 |
| 6,618,733 | B1 | 9/2003 | White et al. | 707/102 |
| 6,718,320 | B1 * | 4/2004 | Subramanian et al. | 707/2 |
| 6,865,569 | B1 | 3/2005 | Gui et al. | 707/3 |
| 6,915,305 | B2 | 7/2005 | Subramanian et al. | 707/100 |
| 7,263,512 | B2 * | 8/2007 | McGoveran | 707/2 |
| 7,440,957 | B1 * | 10/2008 | Kotidis et al. | 707/100 |
| 7,467,128 | B2 * | 12/2008 | Larson et al. | 707/2 |
| 7,478,111 | B2 * | 1/2009 | Tong et al. | 707/200 |
| 2002/0107840 | A1 * | 8/2002 | Rishe | 707/3 |
| 2005/0060647 | A1 * | 3/2005 | Doan et al. | 715/514 |
| 2006/0173861 | A1 * | 8/2006 | Bohannon et al. | 707/100 |
| 2006/0195460 | A1 | 8/2006 | Nori et al. | 707/100 |
| 2006/0195476 | A1 | 8/2006 | Nori et al. | 707/104.1 |
| 2006/0195477 | A1 | 8/2006 | Deem et al. | 707/104.1 |
| 2007/0055692 | A1 * | 3/2007 | Pizzo et al. | 707/103 R |

OTHER PUBLICATIONS

Atkinson, M. P. et al., "Types and Persistence in Database Programming Languages," *ACM Comput. Surv.*, 1987, 19(2), 105-190.

(Continued)

*Primary Examiner*—Don Wong
*Assistant Examiner*—Merilyn P Nguyen
(74) *Attorney, Agent, or Firm*—Woodcock Washburn LLP

(57) ABSTRACT

A data access architecture is provided that includes a mapping architecture for mapping data as may be used by an application to data as persisted in a database. The mapping architecture makes use of two types of mapping views—a query view that helps in translating queries and an update view that helps in translating updates. Incremental view maintenance can be used to translate data between the application and database.

20 Claims, 16 Drawing Sheets

OTHER PUBLICATIONS

Bancilhon, F. et al., "Update Semantics of Relational Views," *ACM Transactions on Database Systems*, 1981, 6(4), 557-575.

Barsalou, T. et al., "Updating Relational Databases through Object-Based Views," *SIGMOD*, 1991, 1-14.

Bernstein, P. A., "Applying Model Management to Classical Meta-Data Problems," *Conference on Innovative Data Systems Research (CIDR)*, 2003, 12 pages.

Blakeley, J. A. et al., "Efficiently Updating Materialized Views," *ACM SIGMOD International Conference on Management of Data*, 1986, 61-71.

Braganholo, V. P. et al., "From XML View Updates to Relational View Updates: Old Solutions to a New Problem," *International Conference on Very Large Data Bases (VLDB)*, Toronto, Canada, 2004, 12 pages.

Carey, M. J. et al., "Of Objects and Databases: A Decade of Turmoil," *International Conference on Very Large Data Bases (VLDB)*, Mombai, India, 1996.

Carey, M. J. et al., "O-O, What Have They Done to DB2?" *VLDB* 1999, 542-553.

Chen, P., "The Entity-Relationship Model—Toward a Unified View of Data," *ACM Trans. on Database Syst.*, 1976, 1(1), 9-36.

Cook, W. R. et al., "Integrating Programming Languages & Databases: What's the Problem?" Draft at http://www.cs.utexas.edu□wcook/Drafts/2005/PLDBProblem.pdf, Oct. 2005, 1-18.

Dayal, U. et al., "On the Updatability of Relational Views," *International Conference on Very Large Data Bases (VLDB)*, 1978, 368-377.

Di Paola, R. A., "The Recursive Unsolvability of the Decision Problem for the Class of Definite Formulas," *J. ACM*, 1969, 16(2), 324-327.

Fagin, R. et al., "Data exchange: semantics and query answering," *Theor. Comput. Sci.*, 2005, 336, 89-124.

Fagin, R. et al., "Composing Schema Mappings: Second-Order Dependencies to the Rescue," *PODS*, Paris, France, 2004, 12 pages.

Foster, J. N. et al., "Combinators for Bi-Directional Tree Transformations: A Linguistic Approach to the View Update Problem," *POPL*, 2004/2005, *article and slides*, 1-75 & 37 pages.

Fowler, M., "Patterns of Enterprise Application Architecture" Addison-Wesley, Boston, MA, 2002, 533 pages.

Gottlob, G. et al., "Properties and Update Semantics of Consistent Views," *ACM Transactions on Database Systems*, 1988, 13(4), 486-524.

Grimes, S., "Object/Relational Reality Check," *Database Programming & Design (DBPD)*, Jul. 1998, 11(7), 8 pages.

Gupta, A. et al., "Maintenance of Materialized Views: Problems, Techniques, and Applications," *IEEE Data Eng. Bull.*, 1995, 18(2), 3-18.

Halevy, A., "Answering queries using views: A survey," *VLDB J.*, 2001, 10(4), 270-294.

IBM, "IBM Rational Data Architect," www.ibm.com/software/data/integration/rda/, downloaded 2007, 3 pages.

Keene, C., "Data Services for Next-Generation SOAs," *SOA WebServices Journal*, 2004, http://soa.sys-con.com/read/4723.htm, 4(12), 4 pages.

Keller, A. M. et al., "Persistence Software: Bridging Object-Oriented Programming and Relational Databases," *SIGMOD*, 1993, 1-6.

Kotidis, Y. et al., "Updates Through Views: A New Hope," *Intl. Conf. on Data Engineering (ICDE)*, 2006, 1-12.

Krishnamurthy, V. et al., "Bringing Object-Relational Technology to Mainstream," *SIGMOD*, 1999, 513-514.

LLBLGen Pro, "LLBLGen Pro O/R Mapper," Generator. www.llblgen.com, downloaded 2007, 4 pages.

Microsoft Corp., "Microsoft BizTalk Server," www.microsoft.com/biztalk/, updated 2007, 3 pages.

Microsoft Corporation, "Common Language Runtime (CLR)," http://msdn2.microsoft.com/en-us/library/ms131047.aspx, 2005, 6 pages.

Microsoft Corporation, "The LINQ Project," http://msdn.microsoft.com/library/en-us/dndotnet/html/linqprojectovw.asp, updated 2007, 3 pages.

Nash, A. et al., "Composition of Mappings Given by Embedded Dependencies," *PODS*, 2005, 12 pages.

Object Management Group, Inc., "Unified Modeling Language," http://www.uml.org/, 2005, 4 pages.

Oracle Technology Network, "Oracle TopLink," www.oracle.com/technology/products/ias_toplink, downloaded 2007, 2 page.

Pierce, B. C., "The Weird World of Bi-Directional Programming," *ETAPS Invited Talk*, Slides at http://www.cis.upenn.edu/~bcpierce/papers/lensesetapsslideshttp://www.cis.upenn.edu/□bcpierce/papers/lensesetapsslides.pdf, Mar. 2006, 140 pages.

Roth, M. et al., "XML Mapping Technology: Making Connections in an XML-Centric World," *IBM Systems J.*, 2006, 45(2), 389-409.

Segoufin, V., "Views and Queries: Determinacy and Rewriting," *PODS*, 2005, 12 pages.

Zhang, W. et al., "The Real Benefits of Object-Relational DB-Technology for Object-Oriented Software Development," *BNCOD*, 2001, 89-104.

Gupta, A. et al., "Materialized Views: Techniques, Implementations, and Applications," *The MIT Press*, 1999.

\* cited by examiner

| | | |
|---|---|---|
| SELECT o.Id, o.AccountNum FROM ESalesOrders o WHERE o IS OF ESalesOrder | = | SELECT SalesOrderId, AccountNum FROM SSalesOrders WHERE IsOnline = "true" | 1 |
| SELECT o.Id, o.AccountNum, o.Tax FROM ESalesOrders o WHERE o IS OF EStoreSalesOrder | = | SELECT SalesOrderId, AccountNum, Tax FROM SSalesOrders WHERE IsOnline = "false" | 2 |
| SELECT o.EOrder.Id, o.ESalesPerson.Id FROM ESalesPersonOrders o | = | SELECT SalesOrderId, SalesPersonId FROM SSalesOrders | 3 |
| SELECT p.Id, p.Bonus FROM ESalesPersons p | = | SELECT SalesPersonId, Bonus FROM SSalesPersons | 4 |
| SELECT p.Id, p.Title, p.HireDate FROM ESalesPersons p | = | SELECT EmployeeId, Title, HireDate FROM SEmployees | 5 |
| SELECT p.Id, p.Name, p.Contact.Email, p.Contact.Phone p | = | SELECT ContactId, Name, Email, Phone FROM SContacts | 6 |

*Fig. 5*

Query views

```
ESalesOrders =                                                    QV₁
SELECT
  CASE WHEN T.IsOnline = True
       THEN ESalesOrder(T.SalesOrderId, T.AccountNum)
       ELSE ESrotreSalesOrder(T.SalesOrderId,
                              T.AccountNum, T.Tax)
  END
FROM SSalesOrders AS T ESalesPersonOrders =                                              QV₂
SELECT ESalesPersonOrder(
         CreateRef(ESalesOrders, T.SalesOrderId),
         CreateRef(ESalesPersons, T.SalesPersonId))
FROM SSalesOrders AS T
```

Update views

```
SSalesOrders =                                                    UV₁
SELECT o.Id, po.Id, o.AccountNum,
       TREAT(o AS EStoreSalesOrder).Tax AS Tax,
       CASE WHEN o IS OF ESalesOrder THEN TRUE ELSE FALSE END
         AS IsOnline
FROM ESalesOrders AS o
INNER JOIN ESalesPersonOrders AS po
ON o.SalesOrderId = Key(po.EOrder).Id
```

Query views

```
ESalesPersons =                                                   QV₃
SELECT ESalesPerson(p.SalesPersonId , p.Bonus ,
                    e.Title, e.HireDate ,
                    c.Name, Contact(c.Email , c.Phone ))
FROM SSalesPersons AS p, SEmployees AS e, SContacts AS c
WHERE p.SalesPersonId = e.EmployeeId
AND e.EmployeeId = c.ContactId
```

Update views

```
SSalesPersons =                                                   UV₂
SELECT p.Id, p.Bonus FROM ESalesPersons AS p SEmployees =                                                      UV₃
SELECT p.Id, p.Title, p.HireDate FROM ESalesPersons AS p SContacts =                                                       UV₄
SELECT p.Id, p.Name, p.Contact.Email, p.Contact.Phone
FROM ESalesPersons AS p
```

*Fig. 6*

MAPPING ARCHITECTURE WITH INCREMENTAL VIEW MAINTENANCE

CROSS REFERENCE TO RELATED APPLICATIONS

This application claims priority to U.S. Provisional Application 60/785,672, "Mapping Architecture with Incremental View Maintenance," filed Mar. 23, 2006.

BACKGROUND

Bridging applications and databases is a longstanding problem. In 1996, Carey and DeWitt outlined why many technologies, including object-oriented databases and persistent programming languages, did not gain wide acceptance due to limitations in query and update processing, transaction throughput, and scalability. They speculated that object-relational (O/R) databases would dominate in 2006. Indeed, DB2® and Oracle® database systems include a built-in object layer that uses a hardwired O/R mapping on top of a conventional relational engine. However, the O/R features offered by these systems appear to be rarely used for storing enterprise data, with the exception of multimedia and spatial data types. Among the reasons are data and vendor independence, the cost of migrating legacy databases, scale-out difficulties when business logic runs inside the database instead of the middle tier, and insufficient integration with programming languages.

Since mid 1990's, client-side data mapping layers have gained popularity, fueled by the growth of Internet applications. A core function of such a layer is to provide an updatable view that exposes a data model closely aligned with the application's data model, driven by an explicit mapping. Many commercial products and open source projects have emerged to offer these capabilities. Virtually every enterprise framework provides a client-side persistence layer (e.g., EJB in J2EE). Most packaged business applications, such as ERP and CRM applications, incorporate proprietary data access interfaces (e.g., BAPI in SAP R/3)

One widely used open source Object-Relational Mapping (ORM) framework for Java® is Hibernate®. It supports a number of inheritance mapping scenarios, optimistic concurrency control, and comprehensive object services. The latest release of Hibernate conforms to the EJB 3.0 standard, which includes the Java Persistence Query Language. On the commercial side, popular ORMs include Oracle TopLink® and LLBLGen®. The latter runs on the .NET platform. These and other ORMs are tightly coupled with the object models of their target programming languages.

BEA® recently introduced a new middleware product called the AquaLogic Data Services Platform® (ALDSP). It uses XML Schema for modeling application data. The XML data is assembled using XQuery from databases and web services. ALDSP's runtime supports queries over multiple data sources and performs client-side query optimization. The updates are performed as view updates on XQuery views. If an update does not have a unique translation, the developer needs to override the update logic using imperative code. ALDSP's programming surface is based on service data objects (SDO).

Today's client-side mapping layers offer widely varying degrees of capability, robustness, and total cost of ownership. Typically, the mapping between the application and database artifacts used by ORMs has vague semantics and drives case-by-case reasoning. A scenario-driven implementation limits the range of supported mappings and often yields a fragile runtime that is difficult to extend. Few data access solutions leverage data transformation techniques developed by the database community, and often rely on ad hoc solutions for query and update translation.

Database research has contributed many powerful techniques that can be leveraged for building persistence layers. And yet, there are significant gaps. Among the most critical ones is supporting updates through mappings. Compared to queries, updates are far more difficult to deal with as they need to preserve data consistency across mappings, may trigger business rules, and so on. As a consequence, commercial database systems and data access products offer very limited support for updatable views. Recently, researchers have turned to alternative approaches, such as bidirectional transformations.

Traditionally, conceptual modeling has been limited to database and application design, reverse-engineering, and schema translation. Many design tools use UML. Only very recently conceptual modeling started penetrating industry-strength data mapping solutions. For example, the concept of entities and relationships surfaces both in ALDSP and EJB 3.0. ALDSP overlays E-R-style relationships on top of complex-typed XML data, while EJB 3.0 allows specifying relationships between objects using class annotations.

Schema mapping techniques are used in many data integration products, such as Microsoft® BizTalk Server®, IBM® Rational Data Architect®, and ETL® tools. These products allow developers to design data transformations or compile them from mappings to translate e-commerce messages or load data warehouses.

SUMMARY

Systems, methods, and computer readable media are provided for implementation and use of a data access architecture that includes a mapping architecture for mapping data as may be used by an application to data as persisted in a database. In one embodiment, the mapping architecture makes use of two types of mapping views—a query view that helps in translating queries and an update view that helps in translating updates. Incremental view maintenance can be used to translate data between the application and database. Further aspects and embodiments are described below.

BRIEF DESCRIPTION OF THE DRAWINGS

The systems and methods for mapping architecture with incremental view maintenance in accordance with the present invention are further described with reference to the accompanying drawings in which:

FIG. 5 illustrates a mapping represented in terms of queries on an entity schema and a relational schema.

FIG. 6 illustrates bidirectional views—the query and update views—generated by the mapping compiler for the mapping in FIG. 5.

DETAILED DESCRIPTION

Novel Data Access Architecture

Figure 1:
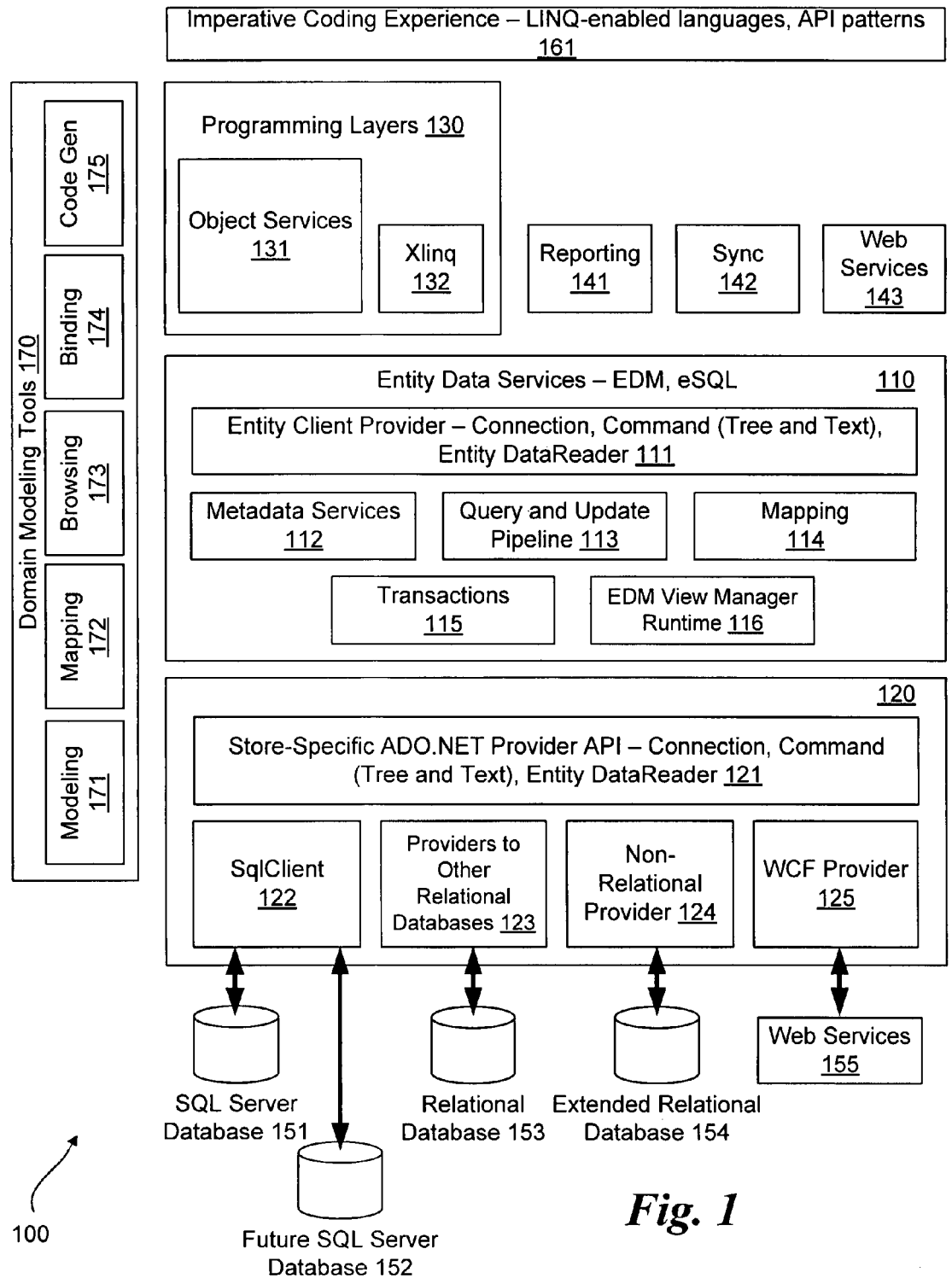
FIG. 1 illustrates an architecture of an exemplary Entity Framework as contemplated herein.

In one embodiment, the innovation may be implemented within and incorporate aspects of a novel data access architecture—an "Entity Framework"—as described in this section. An example of such an Entity Framework is the ADO-.NET vNEXT® data access architecture developed by MICROSOFT® Corporation. The following is a general description of the ADO.NET vNEXT data access architecture along with many implementation-specific details which should not be considered necessary to practice the invention.

Overview

Traditional client-server applications relegate query and persistence operations on their data to database systems. The database system operates on data in the form of rows and tables, while the application operates on data in terms of higher-level programming language constructs (classes, structures etc.). The impedance mismatch in the data manipulation services between the application and the database tier was problematic even in traditional systems. With the advent of service-oriented architectures (SOA), application servers and multi-tier applications, the need for data access and manipulation services that are well-integrated with programming environments and can operate in any tier has increased tremendously.

Microsoft's ADO.NET Entity Framework is a platform for programming against data that raises the level of abstraction from the relational level to the conceptual (entity) level, and thereby significantly reduces the impedance mismatch for applications and data-centric services. Aspects of the Entity Framework, the overall system architecture, and the underlying technologies are described below.

Introduction

Modern applications require data management services in all tiers. They need to handle increasingly richer forms of data which includes not only structured business data (such as Customers and Orders), but also semi-structured and unstructured content such as email, calendars, files, and documents. These applications need to integrate data from multiple data sources as well as to collect, cleanse, transform and store this data to enable a more agile decision making process. Developers of these applications need data access, programming and development tools to increase their productivity. While relational databases have become the de facto store for most structured data, there tends to be a mismatch—the well-known impedance mismatch problem—between the data model (and capabilities) exposed by such databases, and the modeling capabilities needed by applications.

Two other factors also play an important part in enterprise system design. First, the data representation for applications tends to evolve differently from that of the underlying databases. Second, many systems are composed of disparate database back-ends with differing degrees of capability. The application logic in the mid-tier is responsible for data transformations that reconcile these differences and presenting a more uniform view of data. These data transformations quickly become complex. Implementing them, especially when the underlying data needs to be updatable, is a hard problem and adds complexity to the application. A significant portion of application development—up to 40% in some cases—is dedicated to writing custom data access logic to work around these problems.

The same problems exist, and are no less severe, for data-centric services. Conventional services such as query, updates, and transactions have been implemented at the logical schema (relational) level. However, the vast majority of newer services, such as replication and analysis, best operate on artifacts typically associated with a higher-level, conceptual data model. For example, SQL SERVER® Replication invented a structure called "logical record" to represent a limited form of entity. Similarly, SQL Server Reporting Services builds reports on top of an entity-like data model called semantic data model language (SDML). Each of these services has custom tools to define conceptual entities and map them down to relational tables—a Customer entity will therefore need to be defined and mapped one way for replication, another way for report building, yet another way for other analysis services and so on. As with applications, each service typically ends up building a custom solution to this problem, and consequently, there is code duplication and limited interoperability between these services.

Object-to-relational mapping (ORM) technologies such as HIBERNATE® and ORACLE TOPLINK® are a popular alternative to custom data access logic. The mappings between the database and applications are expressed in a custom structure, or via schema annotations. These custom structures may seem similar to a conceptual model; however, applications cannot program directly against this conceptual model. While the mappings provide a degree of independence between the database and the application, the problem of handling multiple applications with slightly differing views of the same data (e.g. consider two applications that want to look at different projections of a Customer entity), or of the needs of services which tend to be more dynamic (a priori class generation techniques do not work well for data services, since the underlying database may evolve quicker) are not well addressed by these solutions.

The ADO.NET Entity Framework is a platform for programming against data that significantly reduces the impedance mismatch for applications and data-centric services. It differs from other systems and solutions in at least the following respects:

1. The Entity Framework defines a rich conceptual data model (the Entity Data Model, or the EDM), and a new data manipulation language (Entity SQL) that operates on instances of this model. Like SQL, the EDM is value-based i.e. the EDM defines the structural aspects of entities, and not the behaviors (or methods).

2. This model is made concrete by a runtime that includes a middleware mapping engine supporting powerful bidirectional (EDM-Relational) mappings for queries and updates.

3. Applications and services may program directly against the value-based conceptual layer, or against programming-language-specific object abstractions that may be layered over the conceptual (entity) abstraction, providing ORM-like functionality. We believe a value-based EDM conceptual abstraction is a more flexible basis for sharing data among applications and data-centric services than objects.

4. Finally, the Entity Framework leverages Microsoft's new Language Integrated Query (LINQ) technologies that extend programming languages natively with query expressions to further reduce, and for some scenarios completely eliminate, the impedance mismatch for applications.

The ADO.NET Entity Framework can be incorporated into a larger framework such as the Microsoft .NET Framework.

The rest of this description of a data access architecture, in the context of an ADO.NET Entity Framework embodiment, is organized as follows. The "motivation" section provides additional motivation for the Entity Framework. The "Entity Framework" section presents the Entity Framework and the Entity Data Model. The "Programming Patterns" section describes programming patterns for the Entity Framework. The "Object Services" section outlines the Object Services module. The "Mapping" section focuses on the Mapping component of the Entity Framework, while the "Query Processing" and "Update Processing" sections explain how queries and updates are handled. The "Metadata" and "Tools" describe the metadata subsystem and the tools components of the Entity Framework.

Motivation

This section discusses why a higher level data modeling layer has become essential for applications and data-centric services.

Information Levels in Data Applications

Today's dominant information modeling methodologies for producing database designs factor an information model into four main levels: Physical, Logical (Relational), Conceptual, and Programming/Presentation.

The physical model describes how data is represented in physical resources such as memory, wire or disk. The vocabulary of concepts discussed at this layer includes record formats, file partitions and groups, heaps, and indexes. The physical model is typically invisible to the application— changes to the physical model should not impact application logic, but may impact application performance.

The logical data model is a complete and precise information model of the target domain. The relational model is the representation of choice for most logical data models. The concepts discussed at the logical level include tables, rows, primary-key/foreign-key constraints, and normalization. While normalization helps to achieve data consistency, increased concurrency, and better OLTP performance, it also introduces significant challenges for applications. Normalized data at the logical level is often too fragmented and application logic needs to assemble rows from multiple tables into higher level entities that more closely resemble the artifacts of the application domain.

The conceptual model captures the core information entities from the problem domain and their relationships. A well-known conceptual model is the Entity-Relationship Model introduced by Peter Chen in 1976. UML is a more recent example of a conceptual model. Most applications involve a conceptual design phase early in the application development lifecycle. Unfortunately, however, the conceptual data model diagrams stay "pinned to a wall" growing increasingly disjoint from the reality of the application implementation with time. An important goal of the Entity Framework is to make the conceptual data model (embodied by the Entity Data Model described in the next section) a concrete, programmable abstraction of the data platform.

The programming/presentation model describes how the entities and relationships of the conceptual model need to be manifested (presented) in different forms based on the task at hand. Some entities need to be transformed into programming language objects to implement application business logic; others need to be transformed into XML streams for web service invocations; still others need to be transformed into in-memory structures such as lists or dictionaries for the purposes of user-interface data binding. Naturally, there is no universal programming model or presentation form; thus, applications need flexible mechanisms to transform entities into the various presentation forms.

Most applications and data-centric services would like to reason in terms of high-level concepts such as an Order, not about the several tables that an order may be normalized over in a relational database schema. An order may manifest itself at the presentation/programming level as a class instance in Visual Basic or C# encapsulating the state and logic associated with the order, or as an XML stream for communicating with a web service. There is no one proper presentation model, however there is value in providing a concrete conceptual model, and then being able to use that model as the basis for flexible mappings to and from various presentation models and other higher level data services.

Evolution of Applications and Services

Data-based applications 10-20 years ago were typically structured as data monoliths; closed systems with logic factored by verb-object functions (e.g., create-order, update-customer) that interacted with a database system at the logical schema level. Several significant trends have shaped the way that modern data-based applications are factored and deployed today. Chief among these are object-oriented factoring, service level application composition, and higher level data-centric services. Conceptual entities are an important part of today's applications. These entities must be mapped to a variety of representations and bound to a variety of services. There is no one correct representation or service binding: XML, Relational and Object representations are all important, but no single one suffices for all applications. There is a need, therefore, for a framework that supports a higher-level data modeling layer, and also allows multiple presentation layers to be plugged in—the Entity Framework aims to fulfill these requirements.

Data-centric services have also been evolving in a similar fashion. The services provided by a "data platform" 20 years ago were minimal and focused around the logical schema in an RDBMS. These services included query and update, atomic transactions, and bulk operations such as backup and load/extract.

SQL Server itself is evolving from a traditional RDBMS to a complete data platform that provides a number of high value data-centric services over entities realized at the conceptual schema level. Several higher-level data-centric services in the SQL Server product—Replication, Report Builder to name just a couple—are increasingly delivering their services at the conceptual schema level. Currently, each of these services has a separate tool to describe conceptual entities and map them down to the underlying logical schema level. The goal of the Entity Framework is to provide a common, higher-level conceptual abstraction that all of these services can share.

The Entity Framework

Microsoft's ADO.NET framework that existed prior to the Entity Framework described herein was a data-access technology that enabled applications to connect to data stores and manipulate data contained in them in various ways. It was part of the Microsoft .NET Framework and it was highly integrated with the rest of the .NET Framework class library. The prior ADO.NET framework had two major parts: providers and services. ADO.NET providers are the components that know how to talk to specific data stores. Providers are composed of three core pieces of functionality: connections manage access to the underlying data source; commands represent a command (query, procedure call, etc.) to be executed against the data source; and data readers represent the result of command execution. ADO.NET services include provider-neutral components such as DataSet to enable offline data programming scenarios. (A DataSet is a memory-resident representation of data that provides a consistent relational programming model regardless of the data source.)

Entity Framework—Overview

The ADO .NET Entity Framework builds on the pre-existing existing ADO.NET provider model, and adds the following functionality:

1. A new conceptual data model, the Entity Data Model (EDM), to help model conceptual schemas.
2. A new data manipulation language (DML), Entity SQL, to manipulate instances of the EDM, and a programmatic representation of a query (canonical command trees) to communicate with different providers.
3. The ability to define mappings between the conceptual schema and the logical schemas.
4. An ADO.NET provider programming model against the conceptual schema.
5. An object services layer to provide ORM-like functionality.
6. Integration with LINQ technology to make it easy to program against data as objects from .NET languages.

The Entity Data Model

The Entity Data Model (EDM) allows for developing rich data-centric applications. It extends the classic relational model with concepts from the E-R domain. In the exemplary embodiment provided herein, organizational concepts in the EDM include entities and relationships. Entities represent top-level items with identity, while Relationships are used to relate (or, describe relationships between) two or more entities.

In one embodiment, the EDM is value-based like the relational model (and SQL), rather than object/reference-based like C# (CLR). Several object programming models can be easily layered on top of the EDM. Similarly, the EDM can map to one or more DBMS implementations for persistence.

The EDM and Entity SQL represent a richer data model and data manipulation language for a data platform and are intended to enable applications such as CRM and ERP, data-intensive services such as Reporting, Business Intelligence, Replication and Synchronization, and data-intensive applications to model and manipulate data at a level of structure and semantics that is closer to their needs. We now discuss various concepts pertaining to the EDM.

EDM Types

An EntityType describes the structure of an entity. An entity may have zero or more properties (attributes, fields) that describe the structure of the entity. Additionally, an entity type must define a key—a set of properties whose values uniquely identify the entity instance within a collection of entities. An EntityType may derive from (or subtype) another entity type—the EDM supports a single inheritance model. The properties of an entity may be simple or complex types. A SimpleType represents scalar (or atomic) types (e.g., integer, string), while a ComplexType represents structured properties (e.g., an Address). A ComplexType is composed of zero or more properties, which may themselves be scalar or complex type properties. A RelationshipType describes relationships between two (or more) entity types. EDM Schemas provide a grouping mechanism for types—types must be defined in a schema. The namespace of the schema combined with the type name uniquely identifies the specific type.

EDM Instance Model

Entity instances (or just entities) are logically contained within an EntitySet. An EntitySet is a homogeneous collection of entities, i.e., all entities in an EntitySet must be of the same (or derived) EntityType. An EntitySet is conceptually similar to a database table, while an entity is similar to a row of a table. An entity instance must belong to exactly one entity set. In a similar fashion, relationship instances are logically contained within a RelationshipSet. The definition of a RelationshipSet scopes the relationship. That is, it identifies the EntitySets that hold instances of the entity types that participate in the relationship. A RelationshipSet is conceptually similar to a link-table in a database. SimpleTypes and ComplexTypes can only be instantiated as properties of an EntityType. An EntityContainer is a logical grouping of EntitySets and RelationshipSets—akin to how a Schema is a grouping mechanism for EDM types.

An Example EDM Schema

A sample EDM schema is shown below:

```xml
<?xml version="1.0" encoding="utf-8"?>
<Schema Namespace="AdventureWorks" Alias="Self" ...>
    <EntityContainer Name="AdventureWorksContainer">
        <EntitySet Name="ESalesOrders"
                   EntityType="Self.ESalesOrder" />
        <EntitySet Name="ESalesPersons"
                   EntityType="Self.ESalesPerson" />
        <AssociationSet Name="ESalesPersonOrders"
                   Association="Self.ESalesPersonOrder">
            <End Role="ESalesPerson"
                   EntitySet="ESalesPersons" />
            <End Role="EOrder" EntitySet="ESalesOrders" />
        </AssociationSet>
    </EntityContainer>
    <!-- Sales Order Type Hierarchy-->
    <EntityType Name="ESalesOrder" Key="Id">
        <Property Name="Id" Type="Int32"
                   Nullable="false" />
        <Property Name="AccountNum" Type="String"
                   MaxLength="15" />
    </EntityType>
    <EntityType Name="EStoreSalesOrder"
                   BaseType="Self.ESalesOrder">
        <Property Name="Tax" Type="Decimal"
                   Precision="28" Scale="4" />
    </EntityType>
    <!-- Person EntityType -->
    <EntityType Name="ESalesPerson" Key="Id">
        <!-- Properties from SSalesPersons table-->
        <Property Name="Id" Type="Int32"
                   Nullable="false" />
        <Property Name="Bonus" Type="Decimal"
                   Precision="28" Scale="4" />
        <!-- Properties from SEmployees table-->
        <Property Name="Title" Type="String"
                   MaxLength="50" />
        <Property Name="HireDate" Type="DateTime" />
        <!-- Properties from the SContacts table-->
        <Property Name="Name" Type="String"
```

-continued

```
            MaxLength="50" />
    <Property Name="Contact" Type="Self.ContactInfo"
            Nullable="false" />
</EntityType>
<ComplexType Name="ContactInfo">
    <Property Name="Email" Type="String"
            MaxLength="50" />
    <Property Name="Phone" Type="String"
            MaxLength="25" />
</ComplexType>
<Association Name="ESalesPersonOrder">
    <End Role="EOrder" Type="Self.ESalesOrder"
            Multiplicity="*" />
    <End Role="ESalesPerson" Multiplicity="1"
            Type="Self.ESalesPerson" />
</Association>
</Schema>
```

High-Level Architecture

This section outlines the architecture of the ADO.NET Entity Framework. Its main functional components are illustrated in FIG. 1 and comprise the following:

Data source-specific providers. The Entity Framework 100 builds on the ADO.NET data provider model. There are specific providers 122-125 for several data sources such as SQL Server 151, 152, relational sources 153, non-relational 154, and Web services 155 sources. The providers 122-125 can be called from a store-specific ADO.NET Provider API 121.

EntityClient provider. The EntityClient provider 110 represents a concrete conceptual programming layer. It is a new, value-based data provider where data is accessed in terms of EDM entities and relationships and is queried/updated using an entity-based SQL language (Entity SQL). The EntityClient provider 111 forms part of an Entity Data Services 110 package that may also include metadata services 112, a query and update pipeline 113, transactions support 115, a view manager runtime 116, and a view mapping subsystem 114 that supports updatable EDM views over flat relational tables. The mapping between tables and entities is specified declaratively via a mapping specification language.

Object Services and other Programming Layers. The Object Services component 131 of the Entity Framework 100 provides a rich object abstraction over entities, a rich set of services over these objects, and allows applications to program in an imperative coding experience 161 using familiar programming language constructs. This component provides state management services for objects (including change tracking, identity resolution), supports services for navigating and loading objects and relationships, supports queries via LINQ and Entity SQL using components such as Xlinq 132, and allows objects to be updated and persisted.

The Entity Framework allows multiple programming layers akin to 130 to be plugged onto the value-based entity data services layer 110 exposed by the EntityClient provider 111. The Object Services 131 component is one such programming layer that surfaces CLR objects, and provides ORM-like functionality.

The Metadata services 112 component manages metadata for the design time and runtime needs of the Entity Framework 100, and applications over the Entity Framework. All metadata associated with EDM concepts (entities, relationships, EntitySets, RelationshipSets), store concepts (tables, columns, constraints), and mapping concepts are exposed via metadata interfaces. The metadata component 112 also serves as a link between the domain modeling tools which support model-driven application design.

Design and Metadata Tools. The Entity Framework 100 integrates with domain designers 170 to enable model-driven application development. The tools include EDM design tools, modeling tools, 171, mapping design tools 172, browsing design tools 173, binding design tools 174, code generation tools 175, and query modelers.

Services. Rich data-centric services such as Reporting 141, Synchronization 142, Web Services 143 and Business Analysis can be built using the Entity Framework 100.

Programming Patterns

The ADO.NET Entity Framework together with LINQ increases application developer productivity by significantly reducing the impedance mismatch between application code and data. In this section we describe the evolution in data access programming patterns at the logical, conceptual and object abstraction layers.

Figure 2:
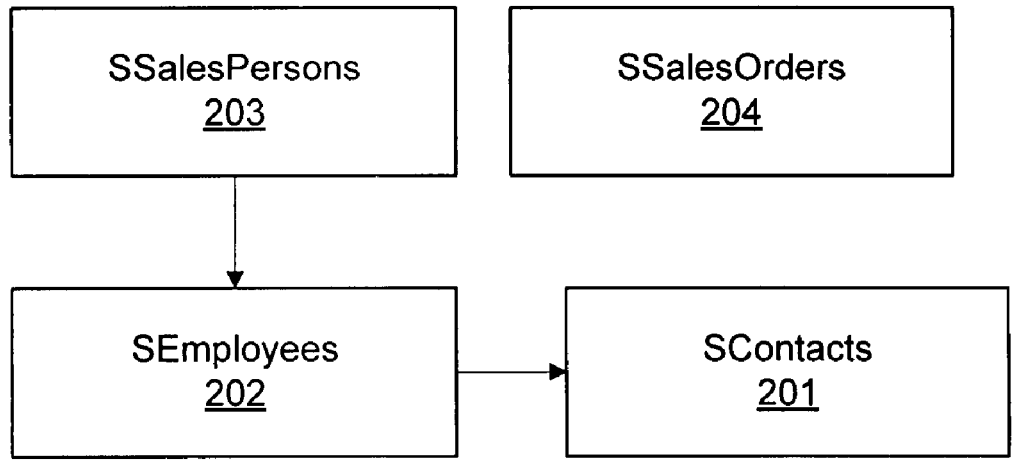
FIG. 2 illustrates an exemplary relational schema.

Consider the following relational schema fragment based on the sample AdventureWorks database. This database consists of SContacts 201, SEmployees 202, SSalesPersons 203, and SSalesOrders 204 tables, which may follow a relational schema such as that illustrated in FIG. 2.

```
SContacts (ContactId, Name, Email, Phone)
SEmployees (EmployeeId, Title, HireDate)
SSalesPersons (SalesPersonId, Bonus)
SSalesOrders (SalesOrderId, SalesPersonId)
```

Consider an application code fragment to obtain the name and hired date of salespeople who were hired prior to some date (shown below). There are four main shortcomings in this code fragment that have little to do with the business question that needs to be answered. First, even though the query can be stated in English very succinctly, the SQL statement is quite verbose and requires the developer to be aware of the normalized relational schema to formulate the multi-table join required to collect the appropriate columns from the SContacts, SEmployees, and SSalesPerson tables. Additionally, any change to the underlying database schemas will require corresponding changes in the code fragment below. Second, the user has to define an explicit connection to the data source. Third, since the results returned are not strongly typed, any reference to non-existing columns names will be caught only after the query has executed. Fourth, the SQL statement is a string property to the Command API and any errors in its formulation will be only caught at execution time. While this code is written using ADO.NET 2.0, the code pattern and its shortcomings applies to any other relational data access API such as ODBC, JDBC, or OLE-DB.

```
void EmpsByDate(DateTime date) {
    using( SqlConnection con =
        new SqlConnection (CONN_STRING) ) {
        con.Open( );
        Sqlcommand cmd = con.CreateCommand( );
        cmd.CommandText = @"
        SELECT SalesPersonID, FirstName, HireDate
        FROM SSalesPersons sp
            INNER JOIN SEmployees e
            ON sp.SalesPersonID = e.EmployeeID
            INNER JOIN SContacts c
            ON e.EmployeeID = c.ContactID
        WHERE e.HireDate < @date";
        cmd.Parameters.AddWithValue("@date",date);
        DbDataReader r = cmd.ExecuteReader( );
        while(r.Read( ) ) {
```

-continued

```
        Console.WriteLine("{0:d}:\t{1}",
            r["HireDate"], r["FirstName"]);
    }}}
```

Figure 3:
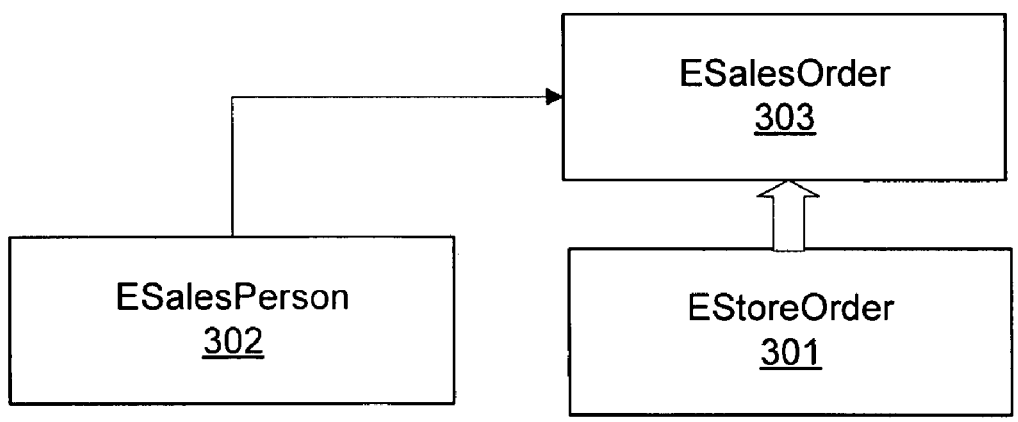
FIG. 3 illustrates an exemplary Entity Data Model (EDM) schema.

The sample relational schema can be captured at the conceptual level via an EDM schema, as illustrated in FIG. 3. It defines an entity type ESalesPerson 302 that abstracts out the fragmentation of SContacts 201, SEmployees 202, and SSalesPersons 203 tables. It also captures the inheritance relationship between the EStoreOrder 301 and ESalesOrder 303 entity types.

The equivalent program at the conceptual layer is written as follows:

```
        void EmpsByDate (DateTime date) {
        using( EntityConnection con =
            new EntityConnection (CONN_STRING) ) {
            con.Open( );
            EntityCommand cmd = con.CreateCommand( );
            cmd.CommandText = @"
                SELECT VALUE sp
                FROM ESalesPersons sp
                WHERE sp.HireDate < @date";
            cmd.Parameters.AddWithValue ("date",
                date);
            DbDataReader r = cmd.ExecuteReader(
                CommandBehavior.SequentialAccess);
            while (r.Read( )) {
                Console.WriteLine("{0:d}:\t{1}",
                    r["HireDate"]], r["FirstName"])
        }}}
```

The SQL statement has been considerably simplified—the user no longer has to know about the precise database layout. Furthermore, the application logic can be isolated from changes to the underlying database schema. However, this fragment is still string-based, still does not get the benefits of programming language type-checking, and returns weakly typed results.

By adding a thin object wrapper around entities and using the Language Integrated Query (LINQ) extensions in C#, one can rewrite the equivalent function with no impedance mismatch as follows:

```
        void EmpsByDate(DateTime date) {
            using (AdventureWorksDB aw =
                new AdventureWorksDB( )) {
                var people = from p in aw.SalesPersons
                    where p.HireDate < date
                    select p;
                foreach (SalesPerson p in people) {
                    Console.WriteLine("{0:d}\t{1}",
                        p.HireDate, p.FirstName);
        }}}
```

The query is simple; the application is (largely) isolated from changes to the underlying database schema; and the query is fully type-checked by the C# compiler. In addition to queries, one can interact with objects and perform regular Create, Read, Update and Delete (CRUD) operations on the objects. Examples of these are described in the Update Processing section.

Object Services

The Object Services component is a programming/presentation layer over the conceptual (entity) layer. It houses several components that facilitate the interaction between the programming language and the value-based conceptual layer entities. We expect one object service to exist per programming language runtime (e.g., .NET, Java). If it is designed to support the .NET CLR, programs in any .NET language can interact with the Entity Framework. Object Services is composed of the following major components:

The ObjectContext class houses the database connection, metadata workspace, object state manager, and object materializer. This class includes an object query interface ObjectQuery<T> to enable the formulation of queries in either Entity SQL or LINQ syntax, and returns strongly-typed object results as an ObjectReader<T>. The ObjectContext also exposes query and update (i.e., SaveChanges) object-level interfaces between the programming language layer and the conceptual layer. The Object state manager has three main functions: (a) cache query results, providing identity resolution, and managing policies to merge objects from overlapping query results, (b) track in-memory changes, and (c) construct the change list input to the update processing infrastructure. The object state manager maintains the state of each entity in the cache—detached (from the cache), added, unchanged, modified, and deleted—and tracks their state transitions. The Object materializer performs the transformations during query and update between entity values from the conceptual layer and the corresponding CLR objects.

Mapping

In one embodiment, the backbone of a general-purpose data access layer such as the ADO.NET Entity Framework may be a mapping that establishes a relationship between the application data and the data stored in the database. An application queries and updates data at the object or conceptual level and these operations are translated to the store via the mapping. There are a number of technical challenges that have to be addressed by any mapping solution. It is relatively straightforward to build an ORM that uses a one-to-one mapping to expose each row in a relational table as an object, especially if no declarative data manipulation is required. However, as more complex mappings, set-based operations, performance, multi-DBMS-vendor support, and other requirements weigh in, ad hoc solutions quickly grow out of hand.

Problem: Updates Via Mappings

The problem of accessing data via mappings can be modeled in terms of "views", i.e., the objects/entities in the client layer can be considered as rich views over the table rows. However, it is well known that only a limited class of views is updateable, e.g., commercial database systems do not allow updates to multiple tables in views containing joins or unions. Finding a unique update translation over even quite simple views is rarely possible due to the intrinsic under-specification of the update behavior by a view. Research has shown that teasing out the update semantics from views is hard and can require significant user expertise. However, for mapping-driven data access, it is advantageous that there exists a well-defined translation of every update to the view.

Furthermore, in mapping-driven scenarios, the updatability requirement goes beyond a single view. For example, a business application that manipulates Customer and Order entities effectively performs operations against two views. Sometimes a consistent application state can only be achieved by updating several views simultaneously. Case-by-case translation of such updates may yield a combinatorial explosion of the update logic. Delegating its implementation to application developers is unsatisfactory because it requires them to manually tackle one of the most complicated parts of data access.

The ADO.NET Mapping Approach

The ADO.NET Entity Framework supports an innovative mapping architecture that aims to address the above challenges. It exploits the following ideas:

1. Specification: Mappings are specified using a declarative language that has well-defined semantics and puts a wide range of mapping scenarios within reach of non-expert users.

2. Compilation: Mappings are compiled into bidirectional views, called query and update views, that drive query and update processing in the runtime engine.

3. Execution: Update translation is done using a general mechanism that leverages materialized view maintenance, a robust database technology. Query translation uses view unfolding.

The new mapping architecture enables building a powerful stack of mapping-driven technologies in a principled, future-proof way. Moreover, it opens up interesting research directions of immediate practical relevance. The following subsections illustrate the specification and compilation of mappings. Execution is considered in the Query Processing and Update Processing sections, below. Further aspects and embodiments of an exemplary mapping architecture as provided herein are also set forth in the section below entitled "Further Aspects and Embodiments."

Specification of Mappings

A mapping is specified using a set of mapping fragments. Each mapping fragment is a constraint of the form $Q_{Entities} = Q_{Tables}$ where $Q_{Entities}$ is a query over the entity schema (on the application side) and $Q_{Tables}$ is a query over the database schema (on the store side). A mapping fragment describes how a portion of entity data corresponds to a portion of relational data. That is, a mapping fragment is an elementary unit of specification that can be understood independently of other fragments.

Figure 4:
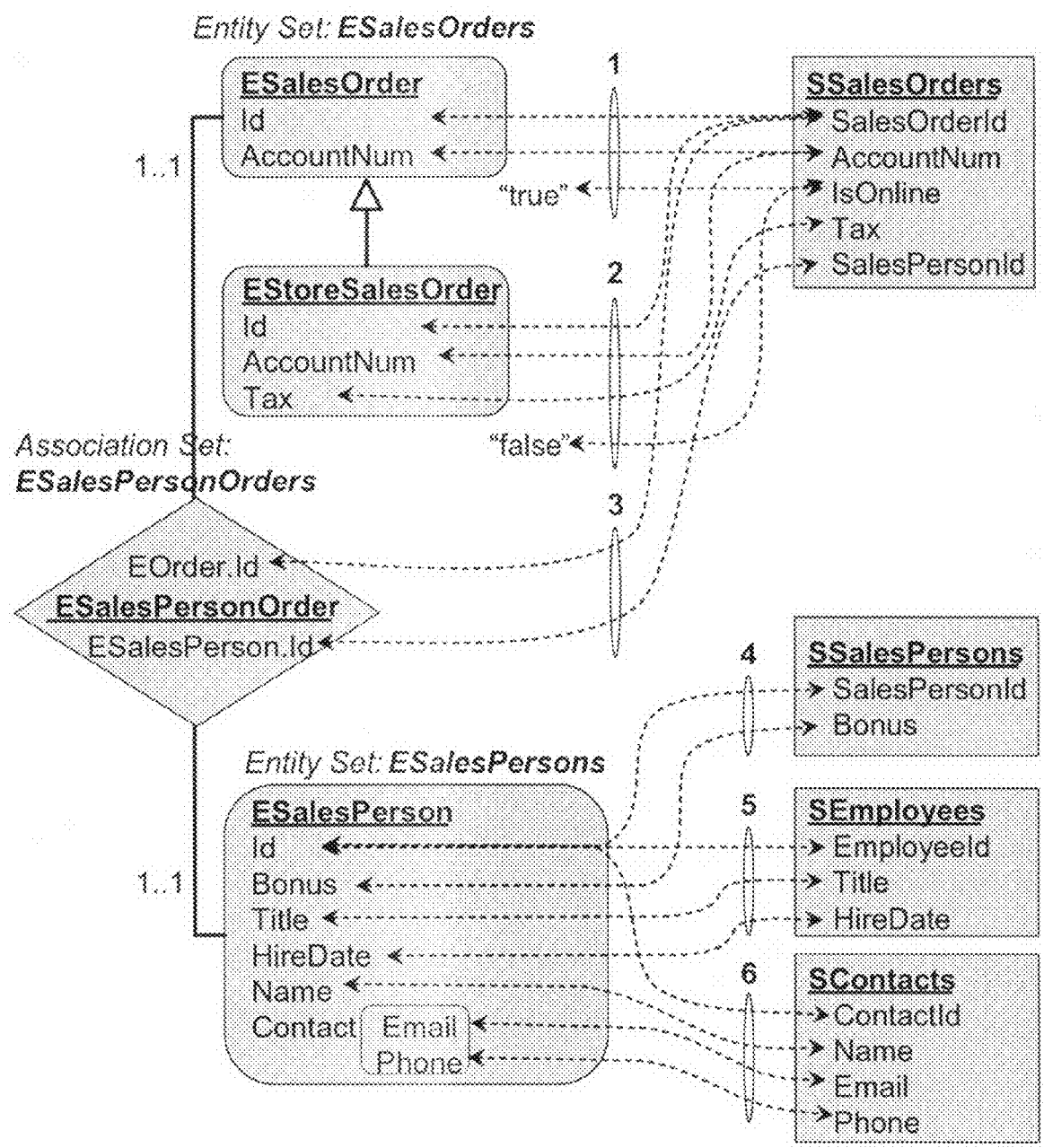
FIG. 4 illustrates a mapping between and entity schema (left) and a database schema (right).

To illustrate, consider the sample mapping scenario in FIG. 4. FIG. 4 illustrates a mapping between and entity schema (left) and a database schema (right). The mapping can be defined using an XML file or a graphical tool. The entity schema corresponds to the one in the Entity Data Model section herein. On the store side there are four tables, SSalesOrders, SSalesPersons, SEmployees, and SContacts. On the entity schema side there are two entity sets, ESalesOrder and ESalesPersons, and one association set, ESalesPersonOrders.

The mapping is represented in terms of queries on the entity schema and the relational schema as shown in FIG. 5.

In FIG. 5, Fragment 1 says that the set of (Id, AccountNum) values for all entities of exact type ESalesOrder in ESalesOrders is identical to the set of (SalesOrderId, AccountNum) values retrieved from the SSalesOrders table for which IsOnline is true. Fragment 2 is similar. Fragment 3 maps the association set ESalesPersonOrders to the SSalesOrders table and says that each association entry corresponds to the primary key, foreign key pair for each row in this table. Fragments 4, 5, and 6 say that the entities in the ESalesPersons entity set are split across three tables SSalesPersons, SContacts, SEmployees.

Bidirectional Views

The mappings are compiled into bidirectional Entity SQL views that drive the runtime. The query views express entities in terms of tables, while the update views express tables in terms of entities.

Update views may be somewhat counterintuitive because they specify persistent data in terms of virtual constructs, but as we show later, they can be leveraged for supporting updates in an elegant way. The generated views 'respect' the mapping in a well-defined sense and have the following properties (note that the presentation is slightly simplified—in particular, the persistent state is not completely determined by the virtual state):

Entities=QueryViews(Tables)

Tables=UpdateViews(Entities)

Entities=QueryViews(UpdateViews(Entities))

The last condition is the roundtripping criterion, which ensures that all entity data can be persisted and reassembled from the database in a lossless fashion. The mapping compiler included in the Entity Framework guarantees that the generated views satisfy the roundtripping criterion. It raises an error if no such views can be produced from the input mapping.

FIG. 6 shows the bidirectional views—the query and update views—generated by the mapping compiler for the mapping in FIG. 5. In general, the views may be significantly more complex than the input mapping, as they explicitly specify the required data transformations. For example, in $QV_1$ the ESalesOrders entity set is constructed from the SSalesOrders table so that either an ESalesOrder or an EStoreSalesOrder is instantiated depending on whether or not the IsOnline flag is true. To reassemble the ESalesPersons entity set from the relational tables, one needs to perform a join between SSalesPersons, SEmployees, and SContacts tables ($QV_3$).

Writing query and update views by hand that satisfy the roundtripping criterion is tricky and requires significant database expertise; therefore, present embodiments of the Entity Framework only accept the views produced by the built-in mapping compiler, although accepting views produced by other compilers or by hand is certainly plausible in alternative embodiments.

Mapping Compiler

The Entity Framework contains a mapping compiler that generates the query and update views from the EDM schema, the store schema, and the mapping (the metadata artifacts are discussed in the Metadata section herein). These views are consumed by the query and update pipelines. The compiler can be invoked either at design time or at runtime when the first query is executed against the EDM schema. The view generation algorithms used in the compiler are based on the answering-queries-using-views techniques for exact rewritings.

Query Processing

Query Languages

In one embodiment, the Entity Framework may be designed to work with multiple query languages. We describe Entity SQL and LINQ embodiments in more detail herein, understanding that the same or similar principles can be extended to other embodiments.

Entity SQL

Entity SQL is a derivative of SQL designed to query and manipulate EDM instances. Entity SQL extends standard SQL in the following ways.

1. Native support for EDM constructs (entities, relationships, complex types etc.): constructors, member accessors, type interrogation, relationship navigation, nest/unnest etc.

2. Namespaces. Entity SQL uses namespaces as a grouping construct for types and functions (similar to XQuery and other programming languages).

3. Extensiblefunctions. Entity SQL supports no built-in functions. All functions (min, max, substring, etc.) are defined externally in a namespace, and imported into a query, usually from the underlying store.

4. More orthogonal treatment of sub-queries and other constructs as compared to SQL.

The Entity Framework may, for example, support Entity SQL as the query language at the EntityClient provider layer, and in the Object Services component. A sample Entity SQL query is shown in the Programming Patterns section herein.

Language Integrated Query (LINQ)

Language-integrated query, or LINQ, is an innovation in .NET programming languages that introduces query-related constructs to mainstream programming languages such as C# and Visual Basic. The query expressions are not processed by an external tool or language pre-processor but instead are first-class expressions of the languages themselves. LINQ allows query expressions to benefit from the rich metadata, compile-time syntax checking, static typing and IntelliSense that was previously available only to imperative code. LINQ defines a set of general-purpose standard query operators that allow traversal, filter, join, projection, sorting and grouping operations to be expressed in a direct yet declarative way in any .NET-based programming language. .NET Languages such as Visual Basic and C# also support query comprehensions—language syntax extensions that leverage the standard query operators. An example query using LINQ in C# is shown in the Programming Patterns section herein.

Canonical Command Trees

In one embodiment, Canonical Command Trees—more simply, command trees—can be the programmatic (tree) representation of all queries in an Entity Framework. Queries expressed via Entity SQL or LINQ may be first parsed and converted into command trees; all subsequent processing can be performed on the command trees. The Entity Framework may also allow queries to be dynamically constructed (or edited) via command tree construction/edit APIs. Command trees may represent queries, inserts, updates, deletes, and procedure calls. A command tree is composed of one or more Expressions. An Expression simply represents some computation—the Entity Framework can provide a variety of expressions including constants, parameters, arithmetic operations, relational operations (projection, filter, joins etc.), function calls and so on. Finally, command trees may be used as the means of communication for queries between the EntityClient provider and the underlying store-specific provider.

Query Pipeline

Query execution in one embodiment of an Entity Framework can be delegated to the data stores. The query processing infrastructure of the Entity Framework is responsible for breaking down an Entity SQL or LINQ query into one or more elementary, relational-only queries that can be evaluated by the underlying store, along with additional assembly information, which is used to reshape the flat results of the simpler queries into the richer EDM structures.

The Entity Framework may assume, for example, that stores must support capabilities similar to that of SQL Server 2000. Queries can be broken down into simpler flat-relational queries that fit this profile. Other embodiments of an Entity Framework could allow stores to take on larger parts of query processing.

A typical query can be processed as follows.

Syntax and Semantic Analysis. An Entity SQL query is first parsed and semantically analyzed using information from the Metadata services component. LINQ queries are parsed and analyzed as part of the appropriate language compiler.

Conversion to a Canonical Command Tree. The query is now converted into a command tree, regardless of how it was originally expressed, and validated.

Mapping View Unfolding. Queries in the Entity Framework target the conceptual (EDM) schemas. These queries must be translated to reference the underlying database tables and views instead. This process—referred to as mapping view unfolding—is analogous to the view unfolding mechanism in database systems. The mappings between the EDM schema and the database schema are compiled into query and update views. The query view is then unfolded in the user query—the query now targets the database tables and views.

Structured Type Elimination. All references to structured types are now eliminated from the query, and added to the reassembly information (to guide result assembly). This includes references to type constructors, member accessors, type interrogation expressions.

Projection Pruning. The query is analyzed, and unreferenced expressions in the query are eliminated.

Nest Pull-up. Any nesting operations (constructing nested collections) in the query are pushed up to the root of the query tree over a sub-tree containing only flat relational operators. Typically, the nesting operation is transformed into a left outer join (or an outer apply), and the flat results from the ensuing query are then reassembled (see Result Assembly below) into the appropriate results.

Transformations. A set of heuristic transformations are applied to simplify the query. These include filter pushdowns, apply to join conversions, case expression folding, etc. Redundant joins (self-joins, primary-key, foreign-key joins) are eliminated at this stage. Note that the query processing infrastructure here does not perform any cost-based optimization.

Translation into Provider-Specific Commands. The query (i.e., command tree) is now handed off to providers to produce a provider-specific command, possibly in the providers' native SQL dialect. We refer to this step as SQLGen.

Execution. The provider commands are executed.

Result Assembly. The results (DataReaders) from the providers are then reshaped into the appropriate form using the assembly information gathered earlier, and a single DataReader is returned to the caller.

Materialization. For queries issued via the Object Services component, the results are then materialized into the appropriate programming language objects.

SQLGen

As mentioned in the previous section, query execution can be delegated to the underlying store. In such embodiments, a query must first be translated into a form that is appropriate for the store. However, different stores support different dialects of SQL, and it is impractical for an Entity Framework to natively support all of them. Instead, the query pipeline can hand over a query in the form of a command tree to the store provider. The store provider may then translate the command tree into a native command. This can be accomplished by translating the command tree into the provider's native SQL dialect—hence the term SQLGen for this phase. The resulting command can then be executed to produce the relevant results.

Update Processing

This section describes how update processing can be performed in the exemplary ADO.NET Entity Framework. In one embodiment, there are two phases to update processing, compile time and runtime. In the Bidirectional Views section provided herein, we described the process of compiling the mapping specification into a collection of view expressions. This section describes how these view expressions are exploited at runtime to translate the object modifications performed at the object layer (or Entity SQL DML updates at the EDM layer) into equivalent SQL updates at the relational layer.

Updates Via View Maintenance

One of the insights exploited in the exemplary ADO.NET mapping architecture is that materialized view maintenance algorithms can be leveraged to propagate updates through bidirectional views. This process is illustrated in FIG. 7.

Figure 7:
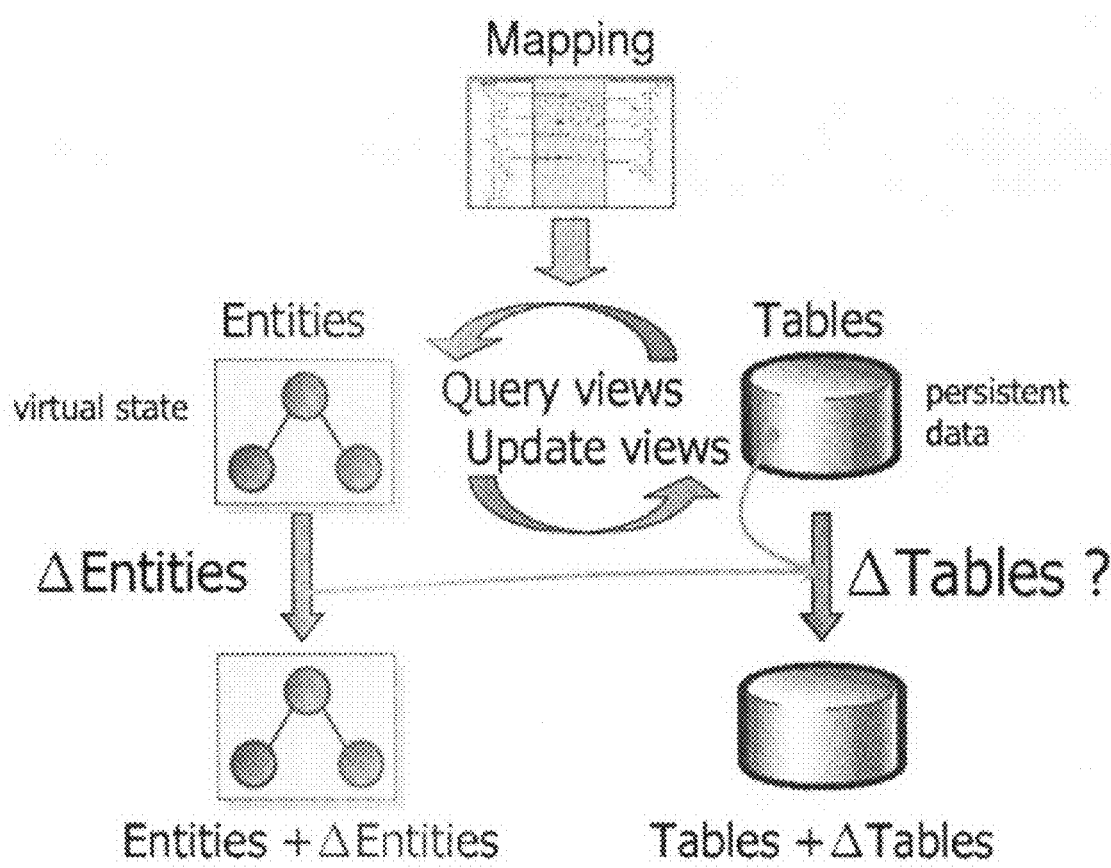
FIG. 7 illustrates a process for leveraging materialized view maintenance algorithms to propagate updates through bidirectional views.

Tables inside a database, as illustrated on the right hand side of FIG. 7, hold persistent data. An EntityContainer, as illustrated on the left side of FIG. 7, represents a virtual state of this persistent data since typically only a tiny fraction of the entities in the EntitySets are materialized on the client. The goal is to translate an update ΔEntities on the state of Entities into an update ΔTables on the persistent state of Tables. This process is referred to as incremental view maintenance, because the update is performed based on an update ΔEntities representing the changed aspects of an entity.

This can be done using the following two steps:

1. View maintenance:

ΔTables=ΔUpdateViews(Entities,ΔEntities)

2. View unfolding:

ΔTables=ΔUpdateViews(QueryViews(Tables),ΔEntities)

In Step 1, view maintenance algorithms are applied to update views. This produces a set of delta expressions, ΔUpdateViews, which tell us how to obtain ΔTables from ΔEntities and a snapshot of Entities. Since the latter is not fully materialized on the client, in Step 2 view unfolding is used to combine the delta expressions with query views. Together, these steps generate an expression that takes as input the initial database state and the update to entities, and computes the update to the database.

This approach yields a clean, uniform algorithm that works for both object-at-a-time and set-based updates (i.e., those expressed using data manipulation statements), and leverages robust database technology. In practice, Step 1 is often sufficient for update translation since many updates do not directly depend on the current database state; in those situations we have ΔTables=ΔUpdateViews(ΔEntities). If ΔEntities is given as a set of object-at-a-time modifications on cached entities, then Step 1 can be further optimized by executing view maintenance algorithms directly on the modified entities rather than computing the ΔUpdateViews expression.

Translating Updates on Objects

To illustrate the approach outlined above, consider the following example which gives a bonus and promotion to eligible salespeople who have been with the company for at least 5 years.

```
using(AdventureWorksDB aw =
    new AdventureWorksDB(...)) {
    // People hired at least 5 years ago
    Datetime d = DateTime.Today.AddYears(-5);
    var people = from p in aw.SalesPeople
            where p.HireDate < d
            select p;
    foreach(SalesPerson p in people) {
        if (HRWebService.ReadyForPromotion(p)) {
            p.Bonus += 10;
            p.Title = "Senior Sales Representative";
        }
    }
    aw.SaveChanges( ); // push changes to DB
}
```

AdventureWorksDB is a tool-generated class that derives from a generic object services class, called ObjectContext, that houses the database connection, metadata workspace, and object cache data structure and exposes the SaveChanges method. As we explained in the Object Services section, the object cache maintains a list of entities, each of which is in one of the following states: detached (from the cache), added, unchanged, modified, and deleted. The above code fragment describes an update that modifies the title and bonus properties of ESalesPerson objects which are stored in the SEmployees and SSalesPersons tables, respectively. The process of transforming the object updates into the corresponding table updates triggered by the call to the SaveChanges method may comprise the following four steps:

Change List Generation. A list of changes per entity set is created from the object cache. Updates are represented as lists of deleted and inserted elements. Added objects become inserts. Deleted objects become deletes.

Value Expression Propagation. This step takes the list of changes and the update views (kept in the metadata workspace) and, using incremental materialized view maintenance expressions ΔUpdateViews, transforms the list of object changes into a sequence of algebraic base table insert and delete expressions against the underlying affected tables. For this example, the relevant update views are $UV_2$ and $UV_3$ shown in FIG. 6. These views are simple project-select queries, so applying view maintenance rules is straightforward. We obtain the following ΔUpdateViews expressions, which are the same for insertions ($\Delta^+$) and deletions ($\Delta^-$):

```
ΔSSalesPersons = SELECT p.Id, p.Bonus
        FROM ΔESalesPersons AS p
ΔSEmployees = SELECT p.Id, p.Title
        FROM ΔESalesPersons AS p
ΔSContacts = SELECT p.Id, p.Name, p.Contact.Email,
        p.Contact.Phone FROM ΔESalesPersons AS p
```

Suppose the loop shown above updated the entity $E_{old}$=ESalesPersons(1, 20, " ", "Alice", Contact("a@sales", NULL)) to $E_{new}$=ESalesPersons(1, 30, "Senior...", "Alice", Contact("a@sales", NULL)). Then, the initial delta is $\Delta^+$ESalesOrders={$E_{new}$} for insertions and $\Delta^-$ESalesOrders={$E_{old}$} for deletions. We obtain $\Delta^+$SSalesPersons={(1, 30)}, $\Delta^-$SSalesPersons={(1, 20)}. The computed insertions and deletions on the SSalesPersons table are then combined into a single update that sets the Bonus value to 30. The deltas on SEmployees are computed analogously. For SContacts, we get $\Delta^+$SContacts=$\Delta^-$SContacts, so no update is required.

In addition to computing the deltas on the affected base tables, this phase is responsible for (a) the correct ordering in which the table updates must be performed, taking into consideration referential integrity constraints, (b) retrieval of store-generated keys needed prior to submitting the final updates to the database, and (c) gathering the information for optimistic concurrency control.

SQL DML or Stored Procedure Calls Generation. This step transforms the list of inserted and deleted deltas plus additional annotations related to concurrency handling into a sequence of SQL DML statements or stored procedure calls. In this example, the update statements generated for the affected salesperson are:

```
BEGIN TRANSACTION
UPDATE [dbo].[SSalesPersons] SET [Bonus] = 30
WHERE [SalesPersonID] = 1
UPDATE [dbo].[SEmployees]
SET [Title] = N'Senior Sales Representative'
WHERE [EmployeeID] = 1
END TRANSACTION
```

Cache Synchronization. Once updates have been performed, the state of the cache is synchronized with the new state of the database. Thus, if necessary, a mini-query-processing step is performed to transform the new modified relational state to its corresponding entity and object state.

Metadata

The metadata subsystem is analogous to a database catalog, and is designed to satisfy the design-time and runtime metadata needs of the Entity Framework.

Metadata Artifacts

Metadata artifacts may include, for example, the following:

Conceptual Schema (CSDL files): The conceptual schema can be defined in a CSDL file (Conceptual Schema Definition Language) and contains the EDM types (entity types, relationships) and entity sets that describes the application's conceptual view of the data.

Store Schema (SSDL files): The store schema information (tables, columns, keys etc.) may be expressed using CSDL vocabulary terms. For example, EntitySets denote tables, and properties denote columns. These may be defined in an SSDL (Store Schema Definition Language) file.

C-S Mapping Specification (MSL file): The mapping between the conceptual schema and the store schema is captured in a mapping specification, typically in an MSL file (Mapping Specification Language). This specification is used by the mapping compiler to produce the query and update views.

Provider Manifest: A Provider Manifest may provide a description of functionality supported by each provider, and can include the following exemplary information:

1. The primitive types (varchar, int, etc.) supported by the provider, and the EDM types (string, int32, etc.) they correspond to.

2. The built-in functions (and their signatures) for the provider.

This information may be used by the Entity SQL parser as part of query analysis. In addition to these artifacts, the metadata subsystem can also keep track of the generated object classes, and the mappings between these and the corresponding conceptual entity types.

Metadata Services Architecture

The metadata consumed by the Entity Framework may come from different sources in different formats. The metadata subsystem may be built over a set of unified low-level metadata interfaces that allow the metadata runtime to work independently of the details of the different metadata persistent formats/sources.

Exemplary metadata services may include:
Enumeration of different types of metadata.
Metadata search by key.
Metadata browsing/navigation.
Creation of transient metadata (e.g., for query processing).
Session independent metadata caching and reusing.

The metadata subsystem includes the following components. The metadata cache caches metadata retrieved from different sources, and provides consumers a common API to retrieve and manipulate the metadata. Since the metadata may be represented in different forms, and stored in different locations, the metadata subsystem may advantageously support a loader interface. Metadata loaders implement the loader interface, and are responsible for loading the metadata from the appropriate source (CSDL/SSDL files etc.). A metadata workspace aggregates several pieces of metadata to provide the complete set of metadata for an application. A metadata workspace usually contains information about the conceptual model, the store schema, the object classes, and the mappings between these constructs.

Tools

In one embodiment, an Entity Framework can also include a collection of design-time tools to increase development productivity. Exemplary tools are:

Model designer: One of the early steps in the development of an application is the definition of a conceptual model. The Entity Framework allows application designers and analysts to describe the main concepts of their application in terms of entities and relationships. The model designer is a tool that allows this conceptual modeling task to be performed interactively. The artifacts of the design are captured directly in the Metadata component which may persist its state in the database. The model designer can also generate and consume model descriptions (specified via CSDL), and can synthesize EDM models from relational metadata.

Figure 8:
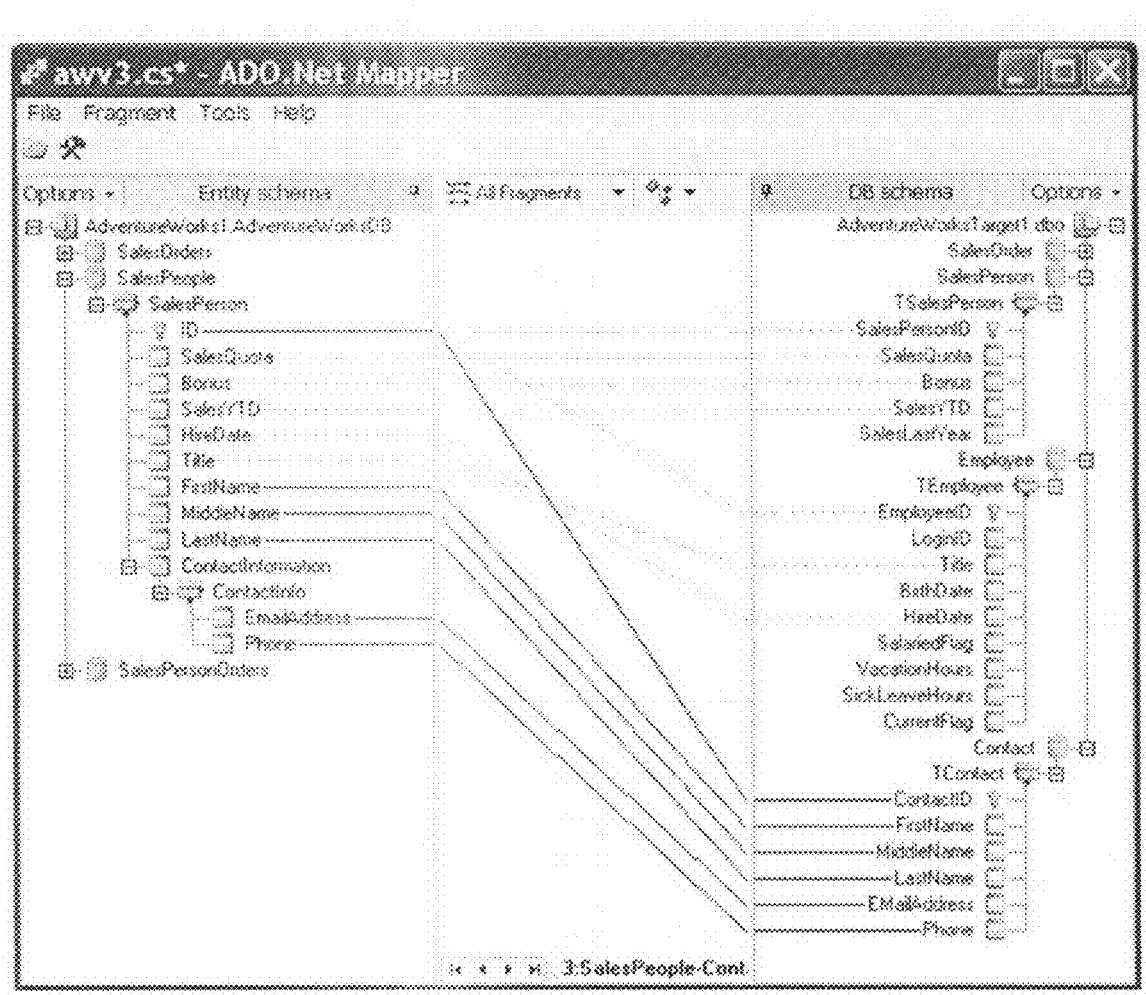
FIG. 8 illustrates a mapping designer user interface.

Mapping designer: Once an EDM model has been designed, the developer may specify how a conceptual model maps to a relational database. This task is facilitated by the mapping designer, which may present a user interface as illustrated in FIG. 8. The mapping designer helps developers describe how entities and relationships in an entity schema presented on the left hand side of the user interface map to tables and columns in the database, as reflected in a database schema presented on the right side of the user interface in FIG. 8. The links in the graph presented in the middle section of FIG. 8 visualize the mapping expressions specified declaratively as equalities of Entity SQL queries. These expressions become the input to the bidirectional mapping compilation component which generates the query and update views.

Code generation: The EDM conceptual model is sufficient for many applications as it provides a familiar interaction model based on ADO.NET code patterns (commands, connections, data readers). However, many applications prefer to interact with data as strongly-typed objects. The Entity Framework includes a set of code generation tools that take EDM models as input and produce strongly-typed CLR classes for entity types. The code generation tools can also generate a strongly-typed object context (e.g., AdventureWorksDB) which exposes strongly typed collections for all entity and relationship sets defined by the model (e.g., ObjectQuery<SalesPerson>).

Further Aspects and Embodiments

Mapping Services

In one embodiment, a mapping component such as 114 in FIG. 1 manages all aspects of mapping and is used internally by the entity client provider 111. A mapping logically specifies a transformation between constructs in two potentially different type spaces. For example, an entity—in conceptual space, as that term is used above—can be specified in terms of database tables in storage space, as illustrated graphically in FIG. 8.

Prescribed mappings are those where the system automatically determines the appropriate mappings for constructs. Non-prescribed mappings allow application designers to control various facets of the mapping. A mapping may have several facets. The end points of the mapping (entities, tables etc.), the set of properties mapped, the update behavior, runtime effects such as delay loading, the conflict-resolution behavior on updates etc. are just a partial list of such facets.

In one embodiment, the mapping component 114 may produce mapping views. Consider a mapping between the storage space and the schema space. An entity is composed of rows from one or more tables. Query Views express an entity in the schema space as a query in terms of tables in storage space. Entities may be materialized by evaluating the query views.

When changes to a set of entities need to be reflected back to the corresponding store tables, the changes can be propagated in reverse fashion through the query views. This is similar to the view-update problem in databases—an update propagation process logically performs updates over the inverse(s) of the query view(s). For this purpose, we introduce the concept of update views—these views describe store tables in terms of entities, and can be thought of as inverses of the query view(s).

In many cases, however, what we are really interested in are incremental changes. Update Delta Views are views (queries) that describe changes to tables in terms of changes to the corresponding entity collections. Update processing for entity collections (or application objects), therefore, comprises computing the appropriate changes to tables by evaluating the update delta views, and then applying these changes to the tables.

In a similar fashion, Query Delta Views describe changes to entity collections in terms of changes to the underlying tables. Invalidations, and more generally, notifications are scenarios that may require the use of query delta views.

As with views in databases, mapping views expressed as queries can then be composed with user queries—leading to a more generalized treatment of mappings. Similarly, mapping delta views expressed as queries allow for a more general and elegant approach to handling updates.

In one embodiment, the power of the mapping views may be constrained. The query constructs used in the mapping view may be only a subset of all query constructs that are supported by the entity framework. This allows for simpler and more efficient mapping expressions—especially in the case of delta expressions.

Delta views may be computed in the mapping component 114 using an algebraic change computation scheme to produce the update (and query) delta views from the update (and query) views. Further aspects of the algebraic change computation scheme are discussed later.

Update delta views allow an Entity Framework to support updates by automatically translating entity changes made by computing applications into store-level updates in a database. In many cases, however, the mapping must be augmented with additional information for performance and/or data integrity.

In some cases, the direct mapping of updates on entities to some or all of its underlying store tables may not be desirable. In such cases, updates must be funneled through stored-procedures to enable data validation as well to maintain a trust boundary. The mapping allows specifications of stored procedures to handle updates and queries over entities.

The mapping may also provide support for optimistic concurrency control in the object services 131. Specifically, properties of an entity may be marked as concurrency-control fields such as a timestamps or versions field, and changes to these objects will succeed only if the values of the concurrency control fields at the store are the same as in the entity. Note that both optimistic-concurrency control-fields are relevant only at the application object layer, not at the store specific layer 120.

In one embodiment, application designers can use the Mapping Specification Language (MSL) to describe various aspects of a mapping. A typical mapping specification contains one or more of the following sections.

1. The Data region may contain descriptions of classes, tables and/or EDM types. These descriptions may describe existing classes/tables/types, or may be used to generate such instances. Server-generated values, constraints, primary keys etc. are specified as part of this section.

2. The Mapping section describes the actual mappings between the type spaces. For instance, each property of an EDM entity is specified in terms of one or more columns from a table (or set of tables).

3. The Runtime region can specify various knobs that control the execution, e.g., optimistic concurrency control parameters and fetching strategy

Mapping Compiler

Figure 9:
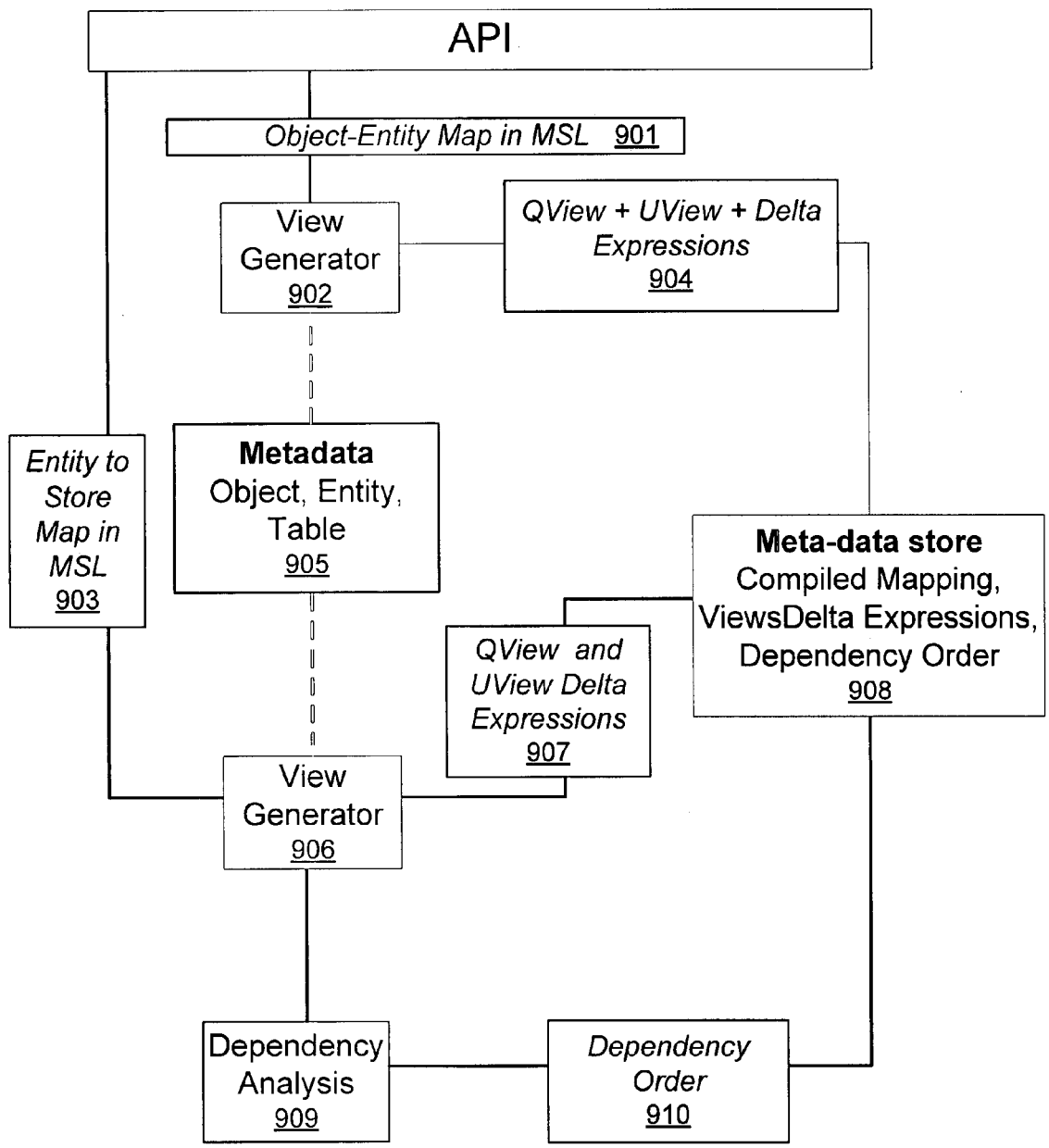
FIG. 9 illustrates compiling a mapping specified in a Mapping Specification Language (MSL) to generate Query and Update Views.

In one embodiment, the domain modeling tool mapping component 172 may comprise a mapping compiler that compiles mapping specifications into a query view, an update view, and the corresponding delta views. FIG. 9 illustrates compiling the MSL to generate the Query and Update Views.

The compilation pipeline performs the following steps:

1. The View Generator 902, called from the API 900, translates the Object ↔Entity mapping information 901 (specified via MSL) and produces a query view, an update view, and the corresponding (query and update) delta expressions 904 in the O↔E (Object to Entity) space. This information can be placed in the metadata store 908.

2. The View Generator 906 translates the Entity ↔Store mapping information 903 (specified via MSL) and produces a query view, an update view and the corresponding (query and update) delta expressions 907 in the E ↔S (Entity to Store) space. This information can be placed in the metadata store 908.

3. The Dependency Analysis 909 component inspects the views produced by the View Generator 906 and determines a consistent dependency order 910 for updates that does not violate referential integrity and other such constraints. This information can be placed in the metadata store 908.

4. The views, the delta expressions and the dependency order 908 are then passed onto the Metadata Services component (112 in FIG. 1).

Update Processing

This section describes the update processing pipeline. In one embodiment, the Entity Framework can support two kinds of updates. Single object changes are changes made to individual objects while navigating the object graph. For single object changes, the system keeps track of the objects that have been created, updated, and deleted in the current transaction. This is available only at the object layer(s). Query-based changes are changes performed by issuing an update/delete statement based on an object query, e.g., as is done in relational databases for updating tables. The Object Providers such as 131 in FIG. 1 may be configured to support single-object changes, but not query-based changes. The Entity Client Provider 111, on the other hand, can support query-based changes, but not single-object changes.

Figure 10:
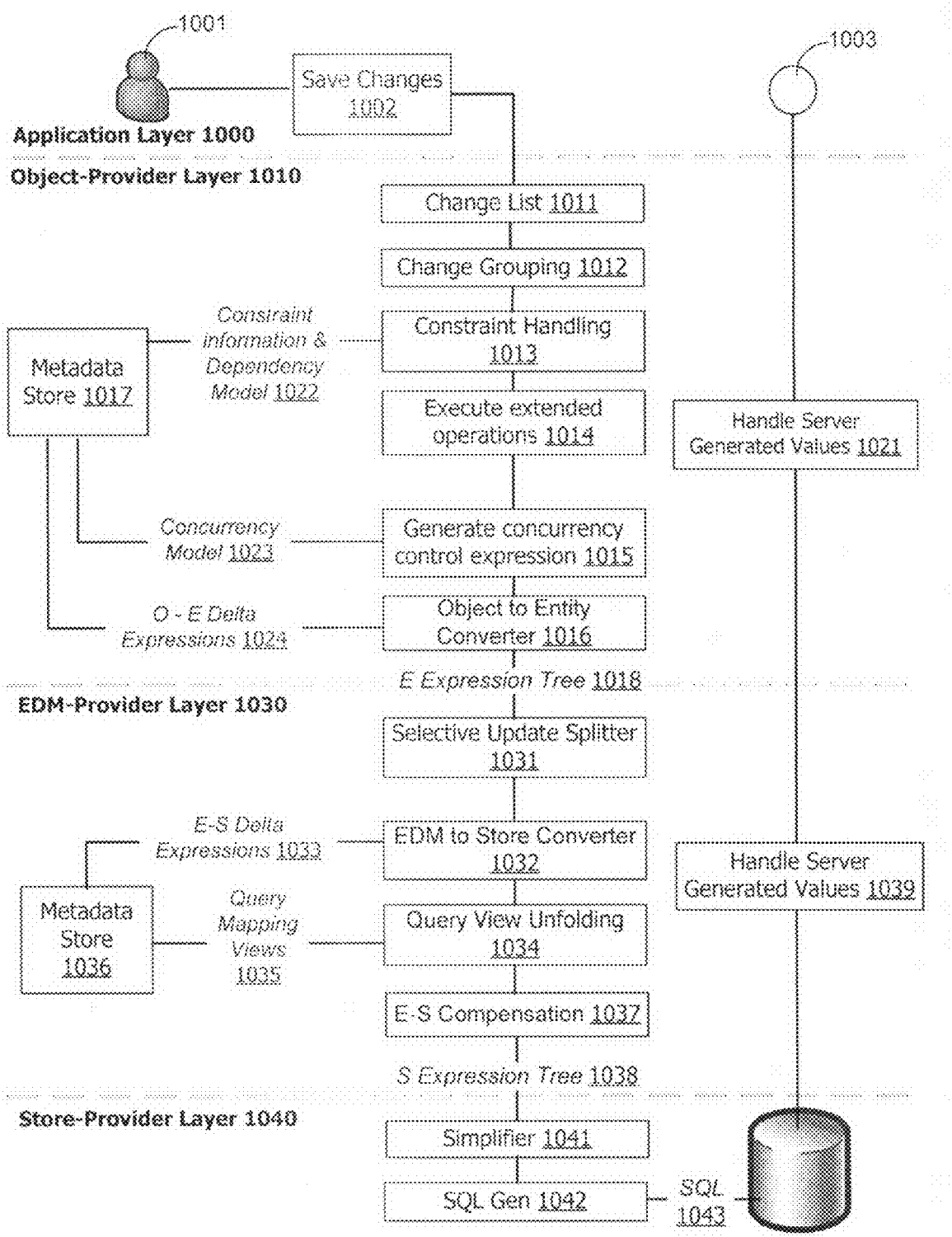
FIG. 10 illustrates update processing.

FIG. 10 provides an illustration of update processing in one exemplary embodiment. In FIG. 10 a user 1001 of an application at application layer 1000 may save changes 1002 to data manipulated by such application. In the object-provider layer 1010, a change list is compiled 1011. Change grouping 1012 is performed on the change list. Constraint handling 1013 may produce constraint information and a dependency model 1022 that is saved to the metadata store 1017. Extended operations are executed 1014. A concurrency control expression is generated 1015, and a concurrency model 1023 may be saved to the metadata store 1017. The object to entity converter 1016 may save object to entity delta expressions 1024 to the metadata store 1017.

An entity expression tree 1018 is passed down to the EDM Provider layer 1030. A selective update splitter 1031 may select certain updates and split them as necessary. An EDM store converter 1032 may save entity-to-store delta expressions 1033 to a metadata store 1036. A query view unfolding component 1035 may save query mapping views 1035 to the metadata store 1036. Entity to store compensation 1037 is performed, and a store expression tree 1038 is passed to the store-provider layer 1040.

At the store provider layer 1040, a simplifier component 1041 may operate first, followed by a SQL generation component 1042, which generates SQL updates 1043 to be executed on the database 1044. Any update results can be passed to a component 1039 in the EDM provider layer 1030 for handling server generated values. Component 1039 can pass results up to a similar component in the object-provider layer 1021. Finally, any results or update confirmation 1003 is returned to the application layer 1000.

As described above, update delta views are generated as part of mapping compilation. These views are used in the update processes to identify the changes to the tables at the store.

For a set of related tables at the store, the Entity Framework may advantageously apply updates in a certain order. For example, the existence of foreign key constraints may require changes to be applied in a particular sequence. The dependency analysis phase (part of mapping compilation) identifies any dependency ordering requirements that can be computed at compile-time.

In some cases, the static dependency analysis technique may not be sufficient, e.g., with cyclic referential integrity constraints (or self-referential integrity constraints). The Entity Framework adopts an optimistic approach, and allows such updates to go through. At runtime, if a cycle is detected, an exception is raised.

As illustrated in FIG. 10, the update processing pipeline for instance-based updates at the application layer 1000 has the following steps:

Change grouping 1012: Group the changes according to the different object collections from the change tracker, e.g., all changes for collection Person are grouped into an insert, delete, and an update set for that collection.

Constraint handling 1013: This step performs any operations that compensate for the fact that no business logic is executed on the value layer—essentially, it allows the object layer to extend the change set. Cascade-delete compensation and dependency ordering (to respect EDM constraints) are performed here.

Extended operation execution 1014: The extra (e.g., delete) operations are executed so that the corresponding business logic can run.

Concurrency control expression generator 1015: To detect if the modified objects are stale, we may generate expressions that check the timestamp column or a set of columns as specified in the mapping meta-data.

Object to EDM conversion 1016: The change lists specified in terms of insert, delete, and update object sets are now converted using mapping delta expressions stored in the metadata store 1017, which are stored after the mapping compilation described with reference to FIG. 9. After this step, the changes are available as expression trees 1018 expressed only in terms of EDM entities The expression tree from step 1018 is next passed to the EDM provider in EDM-Provider Layer 1030. In the EDM provider, the expression tree is processed and the changes are submitted to the store. Note that this expression tree 1018 may also be produced in another way—when an application directly programs against the EDM provider, it may execute a DML statement against it. Such a DML statement is first converted by the EDM provider into an EDM expression tree 1018. The expression tree obtained from a DML statement or from the application layer 1000 is processed in the following way:

Selective update splitter 1031: At this step, some of the updates are split into inserts and deletes. In general, we propagate updates as they are into the lower layers. However, in certain cases, it may not be possible to perform such updates, either because the delta expression rules have not been developed for that case or because the correct translation actually results in inserts and/or deletes to the base tables.

EDM to Store conversion 1032: The EDM-level expression tree 1018 is translated into the store space using the delta expressions from the appropriate mapping.

Query Mapping View Unfolding 1034: The expression tree 1018 may contain some EDM-level concepts. To eliminate them, we unfold the expression tree using the Query Mapping Views 1035 to obtain a tree 1038 in terms of Store-level concepts only. The tree 1038 is optionally processed by an E-S compensation component 1037.

The expression tree 1038 which is now in store space terms is now given to the store provider in story provider layer 1040 which performs the following steps:

Simplification 1041: The expression tree is simplified by using logical expression translation rules.

SQL Generation 1042: Given the expression tree, the store provider generates the actual SQL 1043 from the expression tree 1038.

SQL Execution 1044: The actual changes are performed on the database.

Server-Generated Values: Values generated by the server are returned to the EDP layer 1030. The provider 1044 passes the server-generated values to a component 1039 in layer 1030 which translates them into EDM concepts using a mapping. The application layer 1000 picks up these changes 1003 and propagates them to object level concepts to be installed in the various applications and objects utilized in that layer.

In many cases, the store tables may not be directly updatable due to Database Administrator (DBA) policies, for instance. Updates to tables may only be possible via stored procedures so that certain validation checks can be performed. In such situations, the mapping component must translate object changes into calls to these stored procedures rather than executing "raw" insert, delete, and update SQL statements. In other cases, the "stored" procedures may be specified at the EDP 1010 or at the application layer 1000—in such cases, the mapping component must translate the modified objects into EDM space, and then call the appropriate procedure.

To enable these scenarios, the MSL allows stored procedures to be specified as part of the mapping; additionally, the MSL also supports mechanisms to specify how various database columns are mapped to the parameters of stored procedures.

The EDP layer 1010 supports optimistic concurrency control. When the CDP sends a set of changes to the store, the changed rows may already have been modified by another transaction. The CDP must support a way for users to be able to detect such conflicts, and then resolve such conflicts.

The MSL supports simple mechanisms—timestamp, version-number, changed-columns columns—for conflict detection. When conflicts are detected, an exception is raised, and the conflicting objects (or EDM entities) are available for conflict resolution by the application.

Exemplary Mapping Requirements

The mapping infrastructure may advantageously provide the ability to translate various operations from the application space to the relational space, e.g., object queries written by a developer translated into the relational (storage) space. These translations should be efficient without excessive copying of data. The mapper may provide translations for the following exemplary operations:

1. Queries: Object queries need to be converted into the back-end relational domain and tuples obtained from the database need to be converted to application objects. Note that these queries may be set-based queries (e.g., CSQL or C# Sequences) or navigation-based (e.g., simple following of references).

2. Updates: Changes made by an application to its objects need to be propagated back to the database. Again, the changes made to the objects may be set-based or to individual objects. Another dimension to consider is whether the objects being modified are fully loaded into memory or partially loaded (e.g., a collection hanging off an object may not be present in memory). For updates to partially-loaded objects, designs in which these objects are not required to be fully loaded into memory may be preferable.

3. Invalidations and Notifications: Applications running in the middle tier or client tier may want to be notified when some objects change in the backend. Thus, the OR-mapping component should translate registrations at the object level to the relational space; similarly, when messages are received by a client about modified tuples, the OR-mapper must translate these notifications into object changes. Note that WinFS supports such "notifications" via its Watcher mechanism—however, in that case, the mapping is prescribed, whereas the Entity Framework should support Watchers over a non-prescribed mapping 4. A mechanism similar to notifications is also needed to invalidate stale objects from an Entity Framework process running in the middle or client-tier—if the Entity Framework provides support for optimistic concurrency control to handle conflicting reads/writes, applications may ensure that the data cached at the Entity Framework is reasonably fresh (so that transactions are not aborted due to reads/writes of objects); otherwise, they can make decisions on old data and/or have their transactions abort later. Thus, like notifications, the OR-mapper may have to translate "invalidation" messages from database servers into object invalidations.

5. Backup/Restore/Sync: Backup and mirroring of Entities are two features that may be incorporated in some embodiments. Requirements for these features may simply translate into a specialized query on Entities from the OR-Mapper's perspective; otherwise, special support for such operations can be provided. Similarly, sync may need support from the OR-mapping engine to translate the object changes, conflicts, etc to the store and vice-versa.

6. Participation in Concurrency Control: The OR mapper may advantageously support different ways by which optimistic concurrency control may be used by an application, e.g., using a timestamp value, some particular set of fields, etc. The OR mapper should to translate concurrency control information such as timestamp properties to/from the object space and from/to the relational space. The OR-mapper may even provide support for pessimistic concurrency control (e.g., like Hibernate).

7. Runtime error reporting. In the exemplary embodiment illustrated herein, runtime errors will usually occur at the storage level. These errors can be translated into the application level. The OR mapper may be used to facilitate these error translations.

Mapping Scenarios

Figure 11:
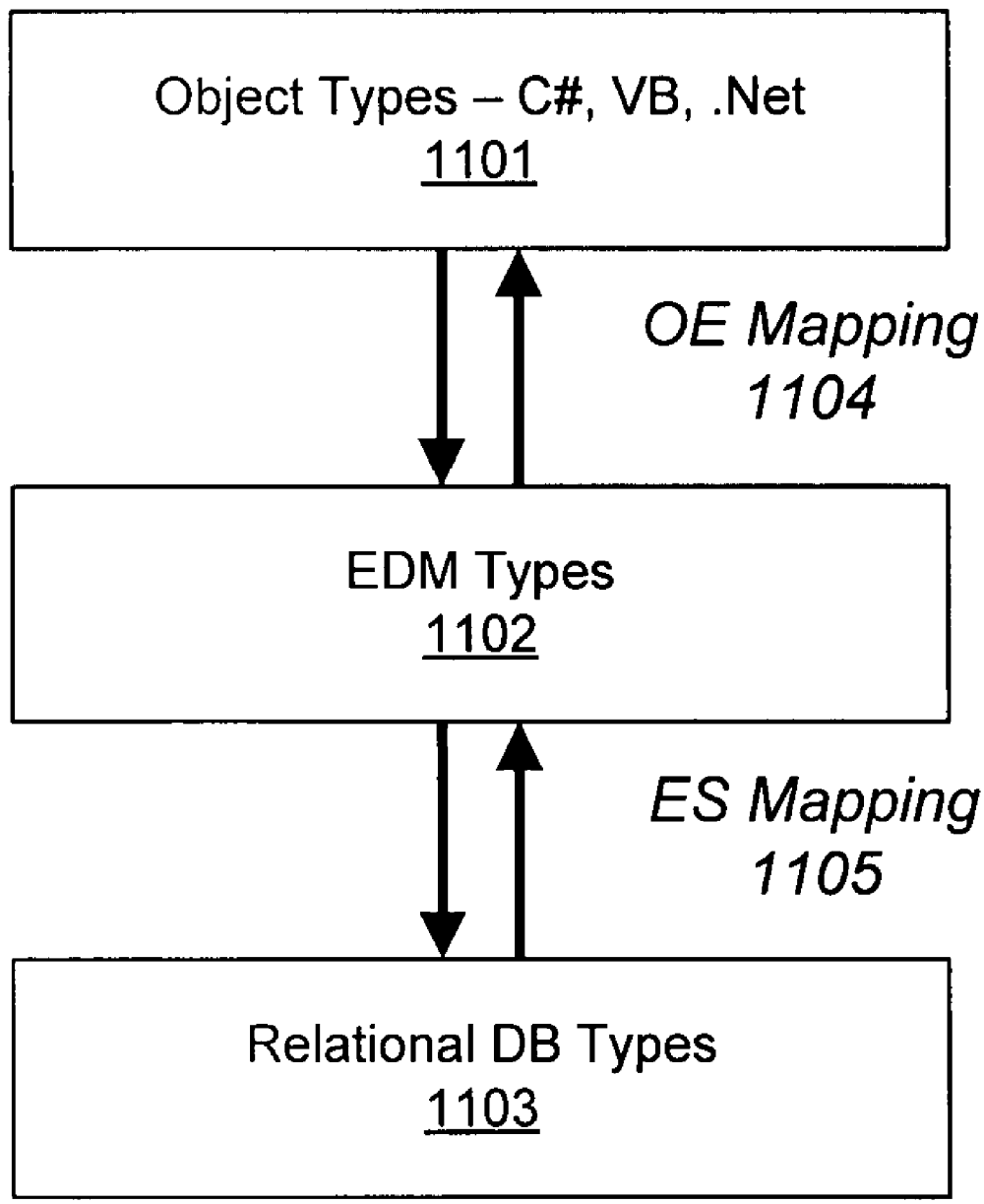
FIG. 11 illustrates exemplary logical parts of an Object Relational (OR) mapper

Before we discuss exemplary developer scenarios that an Entity Framework may support, we illustrate various logical parts of the OR-mapper. In one embodiment, there are five parts in an OR-mapping as illustrated in FIG. 11:

1. Objects/Classes/XML (aka application space) 1101: The developer specifies classes and objects in a language of choice—ultimately, these classes are compiled into CLR assembles and are accessible through reflection APIs. These classes include persistent and non-persistent members as well; also, language-specific details may be included in this part.

2. Entity Data Model Schema (aka conceptual space) 1102: The EDM space is used by the developer for modeling data. As discussed above, the specification of the data model is done in terms of EDM types, relations among entities via associations, inheritance, and so forth.

3. Database schema (aka storage space) 1103: In this space, the developer specifies how the tables are laid out; constraints such as foreign-key and primary key constraints are also specified here. The specification in this space may take advantage of vendor-specific features, e.g., nested tables, UDTs, etc.

4. Object-EDM Mapping 1104: This mapping specifies how various objects and EDM Entities relate to each other, e.g., an array may be mapped to a one-to-many association. Note that is not essential that this mapping is trivial/identity, e.g., multiple classes may map to a given EDM type or vice versa. Note that we may or may not have redundancy/denormalization in these mappings (of course, with denormalization, it is possible to run into problems of keeping the objects/entities consistent).

5. EDM-Store Mapping 1105: This mapping specifies how the EDM entities and types relate to different tables in the database, e.g., different inheritance mapping strategies may be used here.

A developer may specify one or more of the spaces 1101, 1102, or 1103 and the corresponding mappings between one or more mappings between them. If any data space is missing, the developer may give hints on how to generate that space or expect the EDP to generate those spaces automatically, with the corresponding prescribed mappings. For example, if a developer specifies existing classes, tables, and a mapping between them, the EDP generates the internal EDM schema and the corresponding object-EDM and EDM-Store mappings. Of course, in the most general case, the developer can have complete control and specify the data models in these three spaces along with the two mappings. The below table shows the different scenarios supported in the EDP. This is the exhaustive list of cases where the developer may specify objects, EDM entities, tables or not.

| Scenario | Objects Specified? | CDM Specified? | Tables Specified? | Mappings Specified |
|---|---|---|---|---|
| (A) | Y | | | |
| (B) | | Y | | |
| (C) | | | Y | |
| (D) | Y | Y | | OE |
| (E) | Y | | Y | OS |
| (F) | | Y | Y | ES |
| (G) | Y | Y | Y | OE, ES |

Depending on the above scenarios that the EDP wants to support, we will have to provide tools to produce the unspecified data spaces and mappings (in a prescribed manner or based on hints if they are provided). The internal OR mapping engine assumes that all 5 parts of the mapping (objects, EDM specs, tables, OE mapping, ES mapping) are available. Thus, the mapping design should support the most general case, i.e., (G) in the above table.

Mapping Specification Language

One of the "visible" parts of the OR-mapper from the developer's perspective is the Mapping Specification Language or the MSL—the developer specifies how various parts of the mapping tie with each other using this language. Runtime controls (e.g., delay fetching, optimistic concurrency control issues) are also specified using the MSL.

We divide the mapping into three different concepts—each concept addresses a different concern for the mapping process. Note that we do not state whether these specifications are stored in a single file, multiple files, or specified through an external repository (e.g., for the data specification).

1. Data Specification: In this region, a developer can specify the class descriptions, table descriptions, and EDM descriptions. These descriptions may be provided as specifications for generation purposes or they could be specifications for tables/objects that already exist.

The object and table specifications may be described in our format or they may be imported from an external metadata repository using some import tool.

Note that specification of server-generated values, constraints, primary keys, etc is done in this section (e.g., in the EDM specification, constraints are specified as part of the type specification).

2. Mapping Specification: The developer specifies mappings for various objects, EDM types, and tables. We allow developers to specify object-EDM, EDM-store, and object-store mappings. This section tries to have minimal redundancy with the data specification.

In all the three mapping cases (OS, ES and OE), we specify mappings for each class either "directly" at the top-level or "indirectly" inside another class. In each mapping, a field/property is mapped to another field, scalar function of fields, a component, or a set. To allow updates, these mappings need to be bidirectional, i.e., going from object to the store space and back should not lose any information; we may also allow non-bidirectional mappings such that the objects are read-only.

Object-EDM mappings: In one embodiment, we specify a mapping for every object in terms of EDM types.

EDM-Store mappings: In one embodiment, we specify a mapping for every entity in terms of tables.

Object-Store mappings: In one embodiment, we specify a mapping for every object in terms of tables.

3. Runtime Specification: In one embodiment, we allow developers to specify various knobs that control the execution, e.g., optimistic concurrency control parameters, and fetching strategy.

Here is an example of a mapping file for a case where a OPerson object contains a set of addresses. This object is mapped to a EDM Entity type and the set is mapped to an inline set type. The data is stored in two tables—one for the persons and the other for addresses. As stated earlier, it is not essential for the developer to specify all the objects, EDM types and tables—we are just showing case (G) from the above table. The specifications are not supposed to describe any specific syntax; they are meant to illustrate and enable design of a system around the concepts disclosed herein.

Object Specifications

```
ObjectSpec OPerson {                ObjectSpec OAddress {
    string name;                        string state;
    Set<Address> addrs;             }
}
```

EDM Specifications

We specify one entity type CPerson and an inline type CAddress such that each CPerson has a collection of CAddress items.

```
EDMSpec Entity OPerson {            EDMSpec InlineType CAddress {
    string name;                        string state;
    int pid;                            int aid;
    Set<CAddress> addrs;            }
    Key: {pid}
}
```

Store Specifications

We specify two table types SPerson and SAddress along with their keys (tpid and taid).

```
TableSpec SPerson {                 TableSpec SAddress {
    int pid;                            int aid;
    nvarchar(10) name;                  string state;
    Key: {pid}                          Key: {aid}
}                                   }
```

Object-CDM Mappings

The following mapping for OPerson says that object type OPerson is mapped to Entity CPerson. The list after that specifies how each field of OPerson is mapped—name is mapped to name and the addrs collection is mapped to the address collection.

```
Object-CDM OPerson {              Object-CDM OAddress {
    EntitySpec = CPerson              InlineTypeSpec = CAddress
    name ↔ name                       state ↔ state
    addrs ↔ addrs                 }
}
}
```

EDM-Store Mappings

The EDM entity type CPerson is mapped to the table type SPerson with its key and name cname attributes. InlineType CAddress is mapped into SAddress in a simple manner. Note that table SAddress may store a foreign key into SPerson; this constraint could have been specified in the data model specification of the table, not in the mapping.

```
EDM-Store CPerson {    EDM-Store CAddress {   EDM-Store
    TableSpec =            TableSpec = SAddress   CPerson_Address {
    SPerson                    aid ↔ aid              TableSpec =
    name ↔ name                state ↔ state          SAddress
    pid ↔ pid          }                                  aid ↔ aid
}                                                         pid ↔ pid
                                                      }
```

Runtime Specifications

The developer may want to specify that optimistic concurrency control on OPerson be done on the pid and name fields. For OAddress, he/she may specify concurrency control on the state field.

```
RuntimeSpec OPerson {             RuntimeSpec OAddress
    Concurrency  fields:  {pid,       Concurrency fields: {state}
    name}                         }
}
```

Mapping Design Overview

Most OR-mapping technologies, such as Hibernate and ObjectSpaces, have an important shortcoming—they handle updates in a relatively ad-hoc manner. When object changes need to be pushed back to the server, the mechanisms used by these systems handle updates on a case-by-case basis thereby limiting the extensibility of the system. As more mapping cases are supported, the update pipeline becomes more complex and it is difficult to compose mappings for updates. As the system evolves, this part of the system becomes quite cumbersome to change while ensuring that it is correct.

Figure 12:
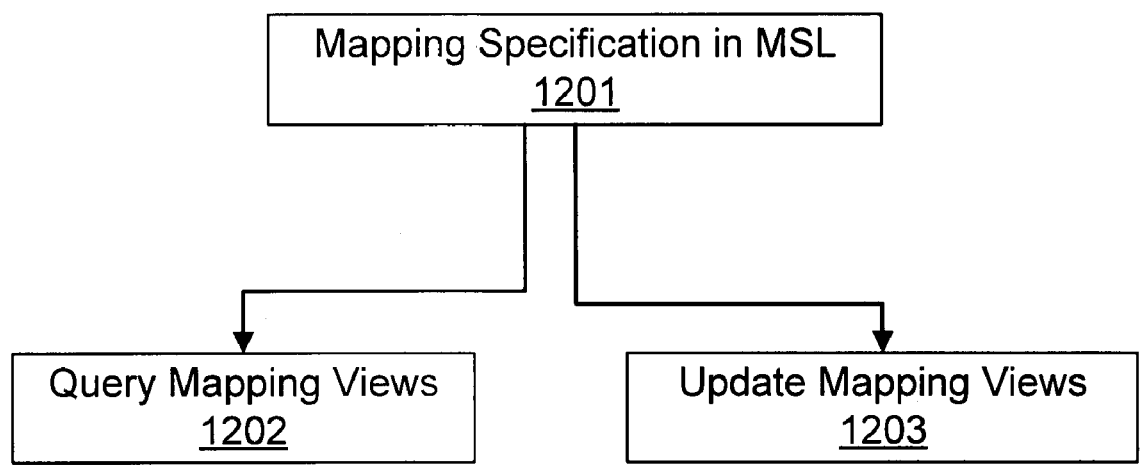
FIG. 12 illustrates generating a Query and Update View by the Entity Data Platform (EDP) when processing a mapping specified in a MSL specification.

To avoid such problems, we use a novel approach where we perform the mapping process using two types of "mapping views"—one that helps us in translating queries and the other that helps in translating updates. As shown in FIG. 12, when a MSL specification 1201 is processed by the EDP, it generates two views 1202 and 1203 internally for the execution of the core mapping engine. As we will see later, by modeling the mapping in terms of these views, we are able to leverage the existing knowledge of materialized-view technology in relational databases—in particular, we take advantage of incremental view-maintenance techniques for modeling updates in a correct, elegant, and extensible manner. We now discuss these two types of mapping views.

We use the notion of Query Mapping Views or QMViews to map table data to objects and Update Mapping Views or UMViews to map object changes to table updates. These views are named because of the (main) reason why they are constructed. The Query View translates object queries into relational queries and converts the incoming relational tuples to objects. Thus, for the EDM-Store mapping, each QView shows how a EDM type is constructed from various tables. For example, if a Person entity is constructed from the join of two tables T_P and T_A, we specify Person in terms of a join between these two tables. When a query is requested over the Person collection, the QMView for Person substitutes Person with an expression in terms of T_P and T_A; this expression then generates the appropriate SQL. The query is then executed at the database; when a reply is received from the server, the QMView materializes the objects from the returned tuples.

To handle object updates, one can imagine pushing changes through the QMViews and leveraging the "view update" technology developed for relational databases. However, updatable views have a number of restrictions on them, e.g., SQL Server does not allow multiple base tables to be modified through a view update. Thus, instead of restricting the types of mapping allowed in the EDP, embodiments of the invention leverage another aspect of materialized-view technology that has much fewer restrictions—view maintenance.

Figure 13:
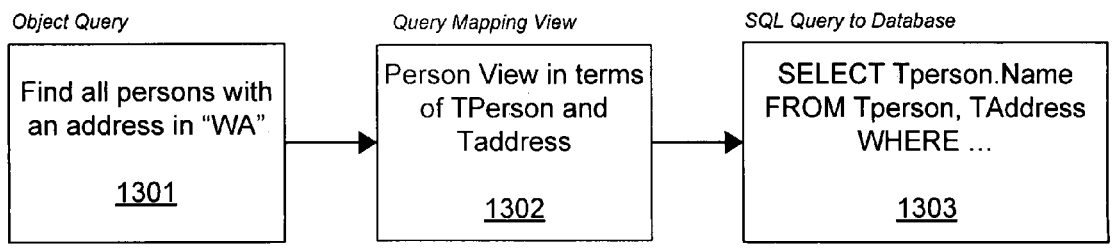
FIG. 13 illustrates using a QMView in a query translation.
Figure 14:
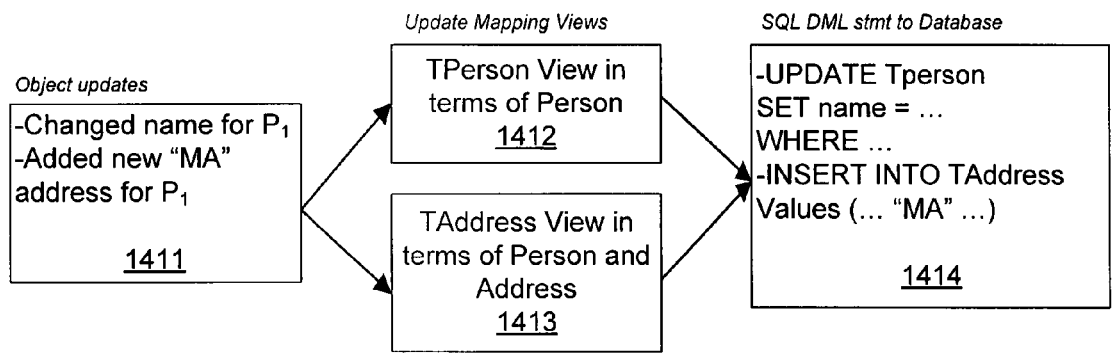
FIG. 14 illustrates using a UMView in a update translation.

We specify Update Mapping Views or UMViews for expressing each table in the system in terms of EDM types, i.e., in some sense, UMViews are the inverse of QMViews. A UMView for a table type on the EDM-Store boundary presents a way by which different EDM types are used to construct that table type's columns. Thus, if we have specified that a Person object type maps to table types T_P and T_A, we not only generate a QMView for the Person type in terms of T_P and T_A, we also generate a UMView that specifies how a row of T_P can be constructed given a Person object type (similarly for T_A). If a transaction creates, deletes, or updates some Person objects, we can use the Update Views to translate such changes from objects into SQL insert, update and delete statements on T_P and T_A—the UMViews help us in performing these updates since they tell us how relational tuples are obtained from objects (via CDM types). FIGS. 13 and 14 show, at a high level, how QMViews and UMViews are used in query and update translation.

Given this approach for modeling tables as views on objects, the process of propagating updates on objects back to tables is similar to the view-maintenance problem where objects are the "base relations" and the tables are the "views". There is a vast amount of database literature addressing the view-maintenance problem and we can leverage it for our purposes. For example, there is a significant body of work that shows how incremental changes to the base relations can be translated into incremental changes on the views. We use an algebraic approach to determine the expressions needed for performing incremental updates on views—we refer to these expressions as delta expressions. Using an algebraic approach, as opposed to a procedural one, for incremental view maintenance is appropriate since it is more amenable to optimization and update simplifications.

In general, advantages of using mapping views in the core engine of the EDP include:

1. Views provide a significant amount of power and flexibility for expressing maps between objects and relations. We can start out with a restricted view-expression language in the core part of the OR-mapping engine. As time and resources permit, the power of the views can be used to gracefully evolve the system.

2. Views are known to compose quite elegantly with queries, updates and views themselves. Composability, especially with respect to updates, was a problematic issue with some of the OR-mapping approaches attempted earlier. By adopting a view-based technology, we can avoid such concerns.

Using the notion of views allows us to leverage a significant body of work in the database literature.

Architectural Layering for Updates

An important issue to consider in implementation of aspects of the invention is, what is the power of the Mapping View Language (or MVL) in which Query and Update Mapping Views are expressed. It is almost powerful enough to capture all the non-prescriptive mappings between the objects and EDM along with the mappings between the EDM and the store. However, for an MVL that supports all the non-relational CLR and EDM concepts natively, we need to design delta expressions or incremental view update rules for all such constructs. In particular, one exemplary embodiment may require update rules for the following non-relational algebra operators/concepts:

Complex types—access to parts of objects, tuple constructors, flattening, complex constants, etc.

Collections—nesting and unnesting, set construction/flattening, cross apply, etc.

Arrays/lists—ordering of elements is not a relational construct; apparently, algebras for ordered lists are quite complex Other EDM constructs and object constructs in the CLR/C# that need to be modeled It is possible to develop delta expressions for incremental updates for these constructs. The main problem with supporting a large set of constructs natively in the MVL is that it can complicate the core engine considerably. In one embodiment, a more desirable approach may be to layer the system such that the "core mapping engine" handles a simple MVL and then layer the non-relational constructs on top of this core. We discuss such a design now.

Our approach for OR-mapping addresses the above problems by "layering"—at compilation time, we first translate each non-relational construct in the object, EDM, and database spaces (WinFS supports nesting, UDTs, etc) into a corresponding relational construct in a prescribed manner and then perform the requested non-prescribed translations between the relational constructs. We refer to this approach as the layered view mapping approach. For example, if a class CPerson contains has a collection of addresses, we first translate this collection into a relational construct as a one-to-many association and then perform the requested non-prescribed translation to tables in the relational space.

MVL Breakdown

The MVL is broken into two layers—one that deals with the actual non-prescriptive mapping in relational terms and a prescriptive translation of non-relational constructs into relational terms. The former language is referred to as R-MVL (for Relational-MVL) and the corresponding mappings are called R-MVL mappings; similarly, the latter (more powerful) language is referred to as N-MVL (for Non-relational MVL) and the mappings are called N-MVL mappings.

In one embodiment, mapping is provided by structuring the design such that all non-relational constructs are pushed to the ends of the query and update pipelines. For example, object materialization may involve constructing objects, arrays, pointers, etc—such "operators" are pushed to the top of the query pipeline. Similarly, when updates occur on objects, we translate changes on non-relational objects (e.g., nested collections, arrays) at the beginning of the pipeline and then propagate these changes through the update pipeline. In systems like WinFS, we need to translate at the end of the update pipeline to UDTs).

By restricting the non-prescribed mappings to R-MVL, we now have a small set of relational constructs for which we need incremental view maintenance rules—such rules have already been developed for relational databases. We refer to the simplified constructs/schemas that are allowed in the R-MVL as Relationally-Expressed Schema or RES. Thus, when some non-relational construct needs to be supported (say) in the object domain, we come up with a corresponding RES construct and a prescribed translation between the object and the RES construct, e.g., we translate an object collection to a one-to-many association in the RES space. Furthermore, to propagate updates on a non-relational constructs N, we come up with delta expressions that translate inserts, deletes, and updates from N to N's corresponding RES construct. Note that these delta expressions are prescribed and are generated by us at design time, e.g., we know how to push changes to a collection onto a one-to-many association. The delta expressions for the actual non-prescribed mappings are generated automatically using incremental view maintenance rules for relational databases. This layered methodology not only removes the requirement of coming up with generalized incremental view maintenance rules for a plethora of non-relational constructs but also simplifies the internal update pipeline.

Note that our layered mapping approach has a similar benefit on the notification pipeline as well—when changes on tuples are received from the server we need to translate them into incremental changes on objects. This is the same requirement as the update pipeline except that we need to use the Query Mapping Views for propagating these changes, i.e., we generate delta expressions for the QMViews.

Apart from simplifying the update and notifications pipeline, layering the MVL has an important advantage—it allows "upper languages" (objects, EDM, database) to evolve without having a significant impact on the core mapping engine. For example, if a new concept is added to the EDM, all we need to do is come up with a prescribed way of converting that into a corresponding RES for that construct. Similarly, if a non-relational concept is present in SQL Server (e.g., UDTs, nesting), we can translate these constructs into the MVL in a prescribed manner and have minimal impact on the MVL and the core engine. Note that the translation between RES-Store and the store tables is not necessarily an identity translation. For example, in backend systems (such as the WinFS backend) that supports UDTs, nestings, etc. the translation is similar to the prescribed object relations.

Figure 15:
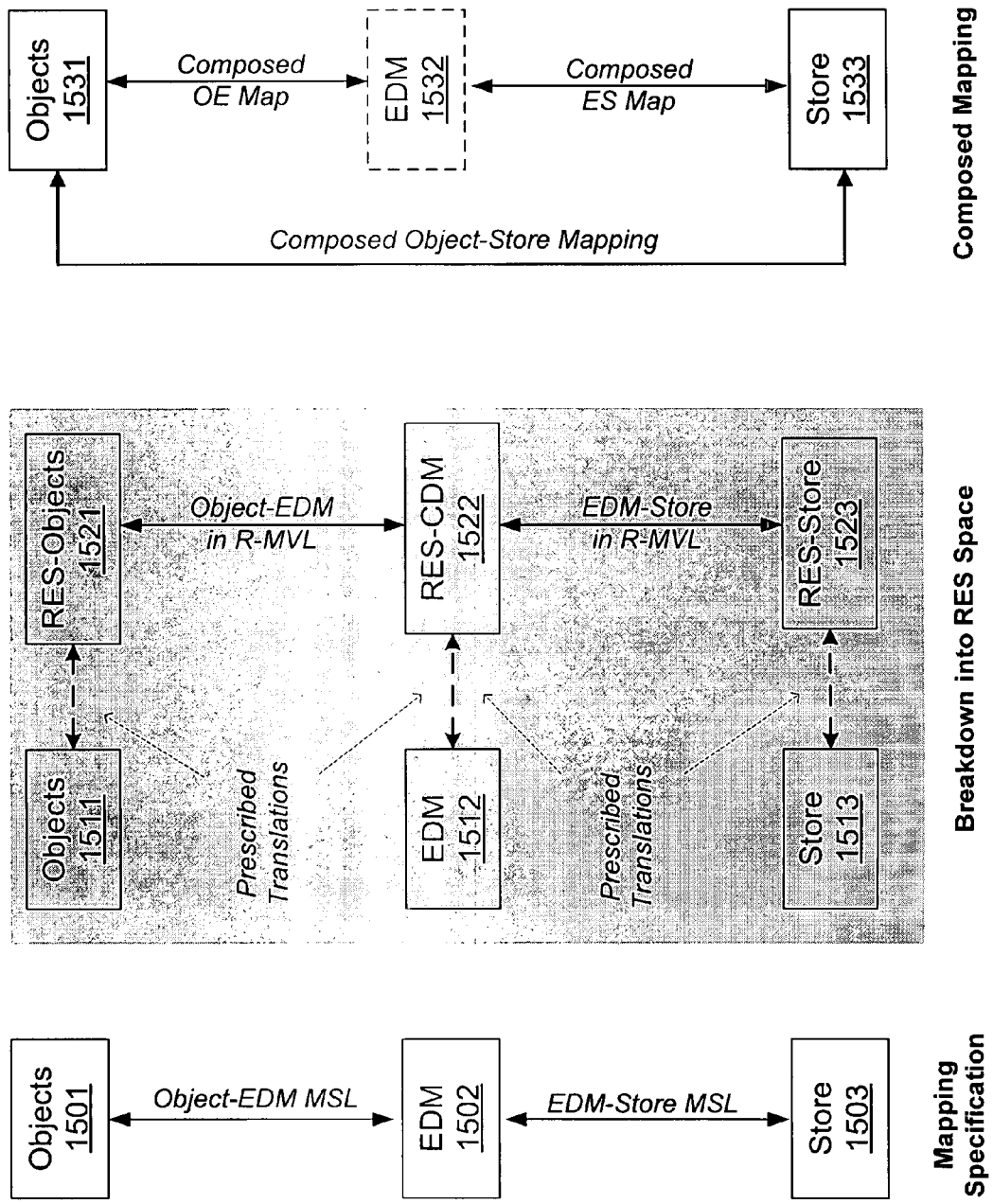
FIG. 15 illustrates compile-time and runtime handling of the mapping views.

FIG. 15 illustrates compile-time and runtime handling of the mapping views. Given the data model and mapping specifications in the MSL as illustrated by 1501, 1502, and 1503, we first generate the corresponding RESs 1521, 1522, and 1523 for the non-relational constructs 1511, 1512, 1513, and the prescribed translations between these constructs and the RESs, i.e., the N-MVL mappings. Then we generate the Query and Update Mapping Views, Object-EDM in R-MVL and EDM-Store in R-MVL, for the non-prescribed mappings requested by the developer—note that these mapping views operate on the RESs using the R-MVL language. At this point, we generate the delta expressions (view maintenance expressions) for the Query and Update Mapping Views—such rules have been developed for relational constructs. Note that delta expressions for QMViews are needed for the purpose of notifications. For the N-MVL mappings, the delta expressions are determined at design time by us since these mappings are prescribed, e.g., when we map an Address collection to a one-to-many association, we also design the corresponding view maintenance expressions.

Given the above views and translations (N-MVL and R-MVL), we can compose them to obtain Query Mapping Views that can express objects 1531 in terms of tables in the store 1533, and Update Mapping Views that can express tables 1533 in terms of objects 1531. As the figure shows, we may choose to retain mapping views such that the EDM Entities in 1532 are not entirely eliminated from the mapping for runtime—a possible reason for keeping these views is to enable certain kinds of query optimization that takes advantage of EDM constraints. Of course, this does not mean that we actually store EDM Entities at runtime.

Figure 16:
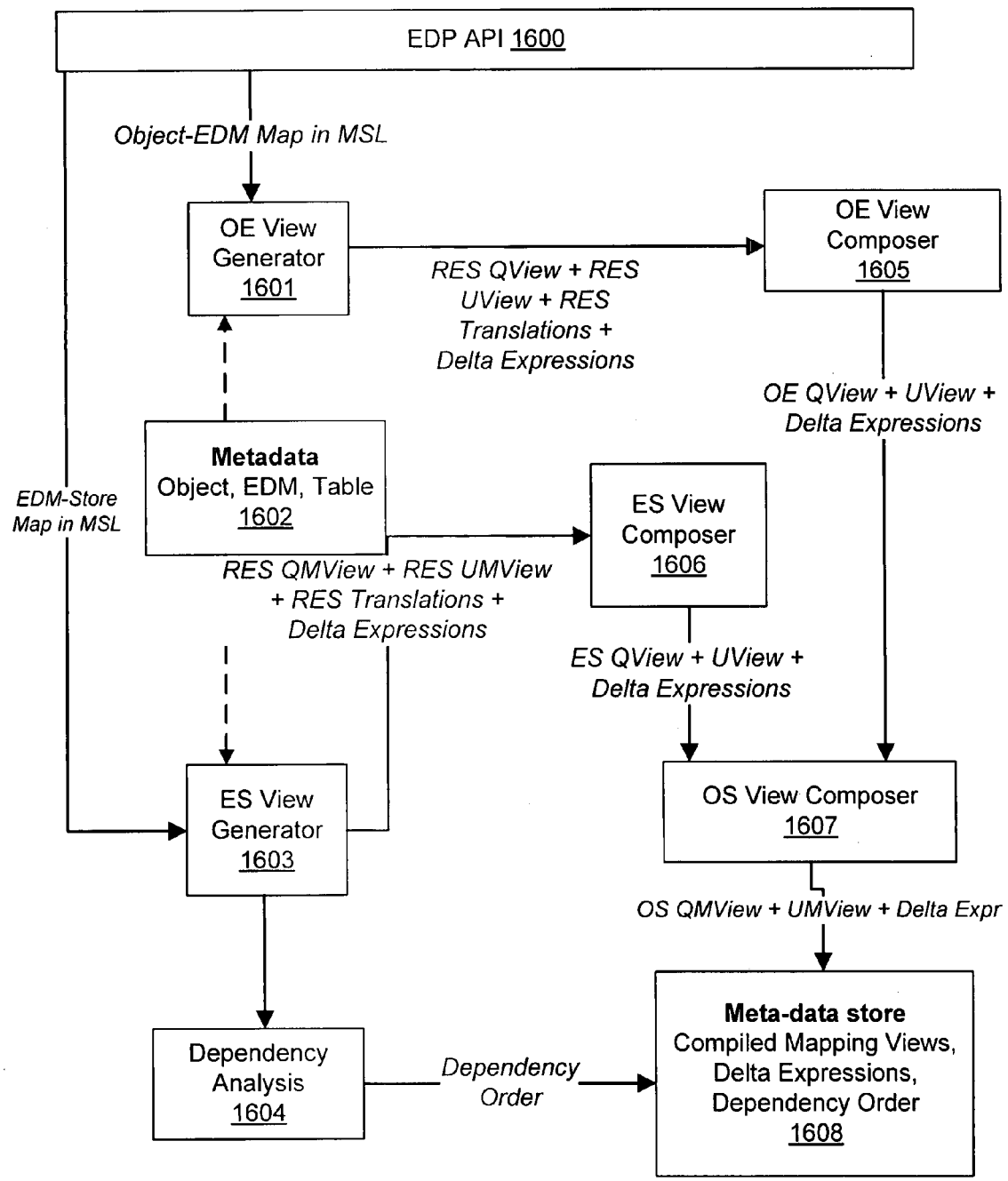
FIG. 16 illustrates interaction of various components in a view compilation process.

FIG. 16 shows the how the different components achieve the view compilation process described above. Applications call the API 1600. The View Generators 1601, 1603 are responsible for three functions: translating the non-relational constructs into RES constructs, generating the Query/Update Views, and generating the delta expressions for propagating updates and notifications. They may use metadata 1602 in carrying out these functions. The OE View composer 1605 takes the Object and EDM information and composes it such that we have algebraic expressions of objects in terms of EDM types; similarly, the ES View Composer 1606 produces algebraic expressions of EDM types in terms of tables. We compose these views further in the OS View Composer 1607 and get a single set of views in the metadata store 1608. As discussed above, we may keep two sets of views for possible query optimization opportunities. Finally, a dependency analysis component 1604 may also operate on the ES View Generator output to provide a dependency order to the metadata store 1608.

Map Compilation Summary

To summarize, for each specification M of a class, EDM type, or a table, we generate the corresponding RESs and the prescribed translations between M and the corresponding RES. Thus, we generate the following as illustrated in FIG. 15:

1. RES corresponding to M—denoted as RES-CDM(M), RES-Object(M) or RES-Store(M)
2. Prescribed translation to express each specification M in terms of RES relations
3. Prescribed translation to express such RES relation in terms of M
4. Query Mapping Views: There are two such views—the OE QMViews express objects in terms of EDM types and ES QMViews that express EDM types in terms of the store (tables)
5. Update Mapping Views: There are two such views—the OE UMViews express EDM types in terms of objects and ES UMViews that express the store tables in terms of EDM types.
6. For incremental maintenance of updates, we also generate delta expressions on the UMViews.

After composing these views, we end up with four maps. These maps are stored in the meta-data store 1608 and are collectively referred to as the Compiled Mapping Views:

Query Maps: Express objects/CDM in terms of CDM/tables.

Update Maps: Express tables/CDM in terms of CDM/objects.

Update Delta Expressions: Express deltas on tables/CDM in terms of deltas on CDM/objects.

Notification Delta Expressions: Express deltas on objects/CDM in terms of deltas on CDM/tables.

Dependency Order: Order in which various insert, delete, update operations must be performed on different relations—this order ensures that the database constraints are not violated during the update process.

Collection Example

We now briefly show the prescribed translations and non-prescribed mappings for the Person example that we have been considering. We present both the Query and Update Mapping Views—the corresponding view maintenance expressions are discussed further below.

RESs

We translate the OPerson into an RES construct R_OPerson that simply reflects the name and pid; similarly, we translate OAddress to R_OAddress. To translate the collection of addresses, we use a one-to-many association R_OPerson_Address. Similarly, for the EDM constructs as well. The RESs for the tables (R_SPerson, R_SAddress) are identity mappings to SPerson and SAddress. These RESs are:

| | | |
|---|---|---|
| R_OPerson (pid, name) | R_CPerson (pid, name) | R_SPerson(pid, name) |
| R_OAddress (aid, state) | R_CAddress (aid, state) | R_SAddress(pid, aid, state) |
| R_OPerson_Address (pid, aid) | R_CPerson_Address (pid, aid) | |

Query Mapping Views

We show the Object-Store mapping (composed across the Object-EDM and EDM-Store mappings).

Non-Prescribed Views in RES Space

The mappings between the object and EDM space are essentially identity. All three views R_CPerson, R_CAddress and R_CPerson_Address are simply projections on R_SPerson and R_SAddress.

| | | |
|---|---|---|
| CREATE VIEW R_OPerson (pid, name) AS SELECT pid, name FROM R_CPerson | CREATE VIEW R_OPerson_Address (pid, aid) AS SELECT pid, aid FROM R_CPerson_Address | CREATE VIEW R_OAddress (aid, state) AS SELECT aid, state FROM R_CAddress |
| CREATE VIEW R_CPerson (pid, name) AS SELECT pid, name FROM R_SPerson | CREATE VIEW R_CPerson_Address (pid, aid) AS SELECT pid, aid FROM R_SAddress | CREATE VIEW R_CAddress (aid, state) AS SELECT aid, state FROM R_SAddress |

Prescribed Translation (Objects in Terms of RES-Objects)

The OPerson object is expressed using R_OPerson, R_OAddress, and R_OPerson_Address by doing a join of R_OPerson_Address with R_OAddress and nesting the result.

CREATE PRESCRIBED VIEW OPerson (pid, name, addrs) AS
SELECT pid, name, NEST(SELECT Address(a.aid, a.state)
          FROM R_OAddress a, R_OPerson_Address pa
          WHERE pa.pid = p.pid AND a.aid = pa.aid)
R_OPerson p Composed View of CPerson The composed expression after simplification can be (recall that we have an identity translation between the tables and their RES constructs for this example):

```
CREATE VIEW OPerson (pid, name, addrs) AS
    SELECT pid, name, NEST(SELECT Address(a.aid, a.state)
                          FROM SAddress a
                          WHERE a.pid = p.pid)
    SPerson p
```

The final view states what one might have expected to obtain by using a "direct" mapping approach. One benefit of the RES approach appears when we look at delta expressions for the update pipeline, and also in the notification pipeline where we need delta expressions for the Query Mapping Views.

Update Mapping Views

Non-Prescribed Views in RES Space

The UMView for R_SPerson is simply a projection on R_CPerson whereas R_SAddress is constructed by joining R_CAddress with the one-to-many association table—R_CPerson_Address. The mapping between the CDM and object space is identity.

```
CREATE VIEW              CREATE VIEW              CREATE VIEW
R_CPerson (pid, name)    R_CPerson_Address        R_CAddress (aid,
AS                       (pid, aid) AS            state) AS SELECT
SELECT pid, name         SELECT pid, aid          aid, state FROM R_
FROM R_OPerson           FROM R_OPerson_          OAddress
                         Address
CREATE VIEW R_SPerson    CREATE VIEW R_SAddress(aid, pid,
(pid, name) AS           state) AS SELECT aid, pid, state
SELECT pid, name,        FROM R_CPerson_Address, R_
FROM R_CPerson           CAddress WHERE R_CPerson_
                         Address.aid = R_CAddress.aid
```

Prescribed Translation (RES-Objects in Terms of Objects)

We need to translate the objects into RESs so that the updates can be pushed from the object space to the RES space. The prescribed translation for R_OPerson is a simple projection whereas the translations for R_OAddress and R_OPerson_Address are achieved by performing a join between a person and its addresses. This is a "pointer join" or a "navigation join".

```
CREATE PRESCRIBED    CREATE              CREATE
VIEW R_OPerson (name, PRESCRIBED         PRESCRIBED VIEW
pid) AS              aid) VIEW R_        R_OPerson_Address-
SELECT name, pid     OAddress(state,     (pid, aid) AS SELECT
FROM OPerson         AS SELECT a.state,  pid, aid FROM
                     a.aid FROM          OPerson p, p.addrs a
                     OPerson p, p.addrs
                     a
```

Composed Update Mapping Views

We compose the above views (and with some simplification) to get the following composed update mapping views:

```
CREATE VIEW                      CREATE VIEW
SPerson (pid, name) AS           SAddress(aid, pid, state) AS
SELECT pid, name,                SELECT a.aid, p.pid, a.state
FROM OPerson                     FROM OPerson p, p.addrs a
```

Thus, the table SPerson can be expressed as a simple projection on OPerson whereas SAddress is obtained by joining OPerson with its addresses.

View Validation

An important property that the generated views need to satisfy is that they must "roundtrip", i.e., to prevent any loss of information, we must ensure that when an Entity/object that is saved and then retrieved, there is no loss of information. In other words, we want to ensure for all entities/objects D:

$$D = \text{QMView}(\text{UMView}(D))$$

Our view generation algorithm ensures this property. If this property is true, we also say that the "query and update views roundtrip" or are bidirectional. We now demonstrate this property for the person-address example. For simplicity, we focus on the round-tripping in the RES space.

Validation for R_OPerson

Substituting SPerson in the query view for OPerson, we get:

```
R_OPerson(pid, name, age) =
    SELECT pid, name, age FROM (SELECT pid, name,
    age FROM R_SPerson)
```

We simplify to get

```
R_OPerson(pid, name, age) = SELECT pid, name,
    age FROM R_SPerson
```

This is equivalent to SELECT * FROM Person.

Validation for OPerson_Address

For R_OPerson_Address, it is slightly more complicated. We have:

```
R_OPerson_Address (pid, aid) = SELECT pid, aid FROM
    R_SAddress
```

Substituting for R_SAddress, we get:

```
R_OPerson_Address (pid, aid) =
    SELECT pid, aid
    FROM (SELECT aid, pid, state
          FROM R_OPerson_Address pa, R_OAddress a
          WHERE pa.aid = a.aid)
```

This gets simplified as:

> R_OPerson_Address (pid, aid) =
> SELECT pid, aid FROM R_OPerson_Address pa, R_OAddress
> a WHERE pa.aid = a.aid To show that the above is really SELECT * FROM R_OPerson_Address we need to have a foreign key dependency R_OPerson_Address.aid→R_OAddress.aid. If this dependency does not hold, we cannot roundtrip. It does hold though since the range of the set-valued property addrs is R_OAddress. This foreign key constraint can be stated in two ways:

1. R_OPerson_Address.aid ⊆ R_OAddress.aid
2. $\pi_{aid,pid}$ (R_OPerson_Address $\bowtie_{aid}$ R_OAddress) = R_OPerson_Address Substituting this constraint in the above expression gives us:

> R_OPerson_Address (pid, aid) = SELECT pid, aid FROM R_OPerson_Address

Validation for Address

R_OAddress is given as:

> R_OAddress (aid, state) = SELECT aid, state FROM R_SAddress

Substituting for R_SAddress we get,

> R_OAddress(aid, state) =
> SELECT aid, state
> FROM (SELECT aid, pid, state
>     FROM R_OPerson_Address pa, R_OAddress a
>     WHERE pa.aid = a.aid)

This can be restated as:

> R_OAddress(aid, state) = SELECT aid, state FROM
> R_OPerson_Address pa,
> R_OAddress a
>         WHERE pa.aid = a.aid Here, the join with R_OPerson_Address is redundant if the foreign key dependency R_OAddress.aid→R_OPerson_Address.aid holds. This dependency holds only if R_OAddress is existentially dependent on R_OPerson (i.e., addrs is a composition). If that's not true, then our views won't roundtrip. Thus, we have a constraint:

> $\pi_{aid, state}$(R_OAddress $\bowtie_{aid}$ R_OPerson_Address) = R_OAddress

Thus, we get the following expression:

> R_OAddress(aid, state) = SELECT aid, state FROM R_OAddress

Query Translation

Query Translator

Figure 17:
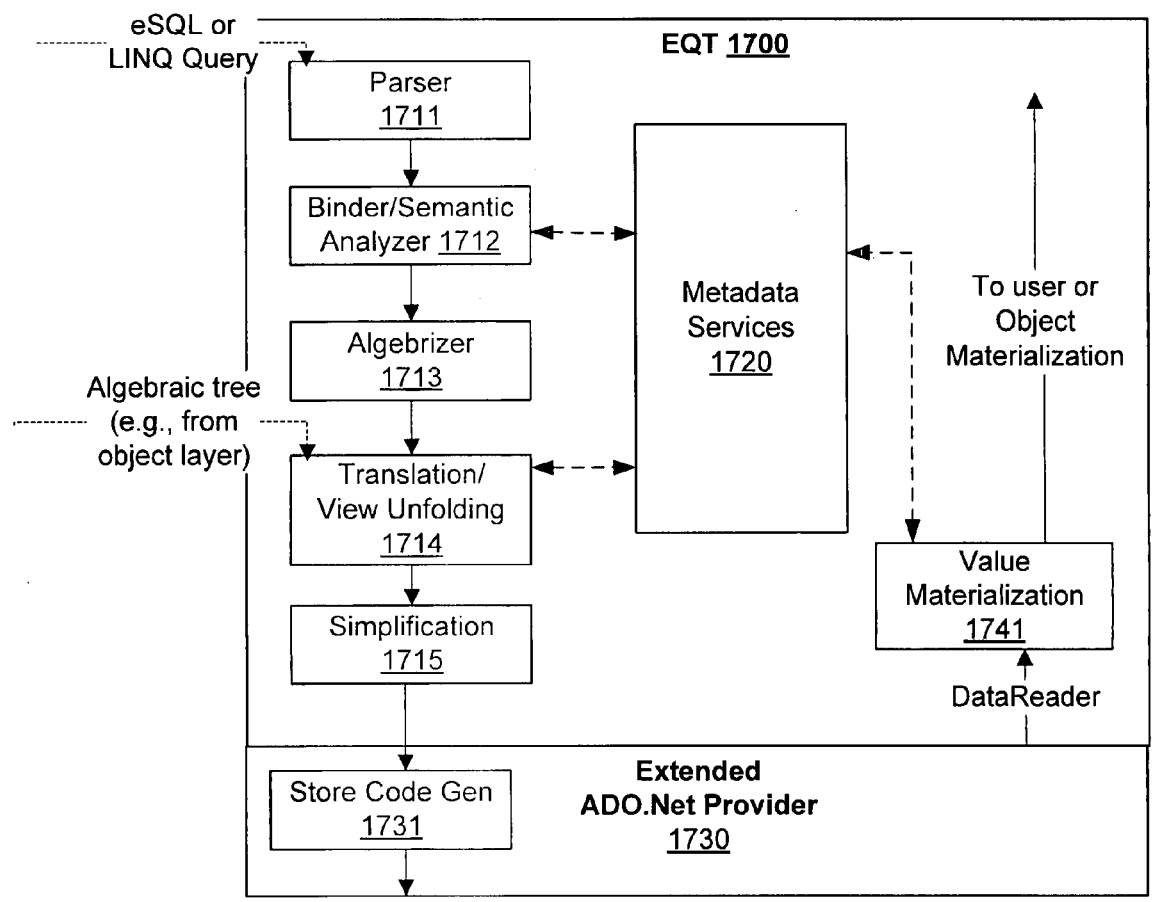
FIG. 17 illustrates an EDP Query Translator (EQT) architecture. The EQT utilizes mapping meta-data to translate queries from object/EDM space into database space.

The EDP Query Translator (EQT) is responsible for translating queries from object/EDM space into provider space by utilizing the mapping meta-data. The user queries may be expressed in a variety of syntaxes, e.g., eSQL, C# Sequences, VB SQL, etc. The EQT architecture is shown in FIG. 17. We now describe the different components of the EQT.

The parser 1711 performs syntax analysis by parsing a user query expressed in one of several forms—including eSQL, Language Integrated Query (LINQ), C# Sequences, and VB Sql. Any syntax errors are detected and flagged at this time.

For LINQ, the syntax analysis (and the semantic analysis) is integrated with the syntax analysis phases of the language (C#, VB, etc.) itself. For eSQL, the syntax analysis phase is a part of the query processor. Typically there is one syntax analyzer per language.

The result of the syntax analysis phase is a parse tree. This tree is then fed into the Semantic Analysis phase 1712.

The Parameter Binder and Semantic Analyzer component 1712 manages parameters in user queries. This module tracks the datatypes and values of parameters in the query.

The Semantic Analysis phase semantically validates the parse tree produced by the syntax analysis phase 1711. Any parameters in the query must already be bound at this time, i.e., their datatypes must be known. Any semantic errors are detected and flagged here; if successful, the result of this phase is a semantic tree.

Note that for LINQ, as mentioned earlier, the semantic analysis phase is integrated with the semantic analysis phases of the language itself. There is typically one semantic analyzer per language since there is one syntax tree per language.

The semantic analysis phase logically comprises of the following:

1. Name Resolution: All names in the query are resolved at this time. This includes references to extents, types, properties of types, methods of types etc. As a side effect, the datatypes of such expressions are also inferred. This subphase interacts with the metadata component.

2. Type Checking and Inferencing: Expressions in the query are type checked, and the result types are inferred.

3. Validation: Other kinds of validation occur here. For example, in a SQL processor, if a query block contains a group-by clause, this phase may be used to enforce the restriction that the select list may only refer to group-by keys or aggregate functions.

The result of the semantic analysis phase is a semantic tree. At this time, the query is considered to be valid—no further semantic errors should occur anytime later during query compilation.

The algebraization phase 1713 takes the result of the semantic analysis phase 1712, and converts it into a form more suitable for algebraic transformations. The result of this phase is a logical extended relational operator tree, aka algebra tree.

The algebra tree is based on the core relational algebra operators—select, project, join, union, and extends this with additional operations like nest/unnest and pivot/unpivot.

The view unfolding phase 1714 of the query translator substitutes, possibly recursively, the QMView expressions for any objects referenced in the user query. At the end of the view translation process, we get a tree that describes the query in store terms.

In the case of the object layer, the view unfolding may have been done all the way to the store space (in case we had an optimized OS mapping stored in the metadata repository) or the query tree may have been transformed to the EDM layer. In the latter case, we need to take this tree and re-feed it to the View Unfolding component with the requirement that the EDM concepts be now translated into the store concepts.

The Transformation/Simplification component 1715 can be provider 1730 specific, or in an alternative embodiment may be an EDP-generic component that can be leveraged by various providers. There are a few reasons for performing transformations on the query tree:

1. Operator pushing to store: The EQT pushes complex operators (e.g., join, filter, aggregate) to the store. Otherwise, such operations would have to be implemented in the EDP. The value materialization layer of the EDP only performs "non-relational compensating" operations such as nesting. If we are unable to push down an operator X below the value materialization nodes in the query tree and the value materialization layer cannot perform operation X, we declare the query to be illegal. For example, if the query has an aggregation operation that cannot be pushed to the provider, we will declare the query to be illegal since the value materialization layer does not perform any aggregations.

Improved performance: The reduced complexity of the query is important and we would like to avoid sending gigantic queries to the backend store. For example, some of the current queries in WinFS are very complex and take a large amount of time to execute (the corresponding hand-written queries are more than an order of magnitude faster).

Improved debuggability: Simpler queries would also make it easier for the developer to debug the system and understand what is going on.

The transformation/simplification module 1715 may transform some or all of the algebra tree representing the query into equivalent subtrees. Note that these heuristic-based transformations are logical, i.e., not done using a cost model. The kind of logical transformations may include the following exemplary provider-specific services:

Sub-query flattening (view and nested sub-queries)
Join elimination
Predicate elimination and consolidation
Predicate Pushdown
Common sub-expression elimination
Projection Pruning
Outer Join→Inner Join transformations
Eliminating left-correlation This SQL Generation module 1731 is part of the provider component 1730 since the generated SQL is specific to the provider. After simplification, the algebra tree is passed on to the provider who may further perform provider-specific transformations or simplifications before generating the appropriate SQL.

After the query executes at the server, the results are streamed to the EDP client. The provider 1730 exposes DataReaders that can be used by an application to obtain the results as EDM Entities. The value materialization service 1741 can take these readers and convert them to the relevant EDM Entities (as new DataReaders). These entities may be consumed by an application or the new DataReaders can be passed to an upper object materialization service.

The EQT 1700 represents materialization as an operator in the query tree. This allows the regular query translation pipeline to produce objects in the EDM space, which can then be directly fed to users, instead of requiring special out-of-band operations to perform the actual materialization. This also allows for various optimizations like partial object fetch, eager loading etc to be performed on the user queries.

Query Example

Consider the Person-Address example that we have been developing. Suppose that the user wants to run the following query—find all persons in WA. We can write this query in pseudo-CSQL as:

```
SELECT x.name FROM OPerson x, x.addrs y WHERE y.state = "WA"
```

If we do view-unfolding using the Query View for Person at this point, we get:

```
SELECT x.name
FROM (SELECT pid, name,
       NEST(SELECT OAddress(a.aid, a.state) FROM SAddress
a where a.pid = p.pid)
    FROM SPerson p) as x, x.addrs y
WHERE y.state = "WA"
```

This query can be simplified before sending to the backend server:

```
SELECT p.name
FROM SPerson p, SAddress a
WHERE p.pid = a.pid
```

Metadata

The EQT requires various pieces of metadata during the compilation and execution of a query. This metadata includes Application-space metadata: Information about Extents/Collections, Types, Type properties, Type methods required during semantic analysis to validate user queries.

Schema-space metadata: Information about Entity Collections, CDM Types and properties required during view compilation. Information about relationships between entities and constraints on entities for transformations.

Storage-space metadata: As described above.

Application→Schema mappings: Logical Operator tree representing view definition required for View Expansion.

Schema→Storage mappings: As described above.

Error Reporting Pipeline

Errors at various stages of query processing should be reported in user-understandable terms. Various compilation and execution time errors may occur during query processing. Errors during syntax and semantic analysis are mostly in application space, and require very little special handling. Errors during transformations are mostly resource errors (out-of-memory etc), and need some special handling. Errors during code-generation and subsequent query execution may need to be appropriately processed. A key challenge in error reporting is to map runtime errors that occur at lower levels of abstraction to errors that are meaningful at the application level. This means we need to process lower-level errors through the storage, conceptual, and application mappings.

Query Example

Our sample OO query fetches the name of all persons who have an address in Washington:

```
SELECT p.name
FROM OPerson p, p.addrs as a
WHERE a.state = 'WA'
```

Step 1: Conversion to Relational Terms

This query can be converted into the following purely relational query expressed in terms or R_OPerson, R_OPerson_Address, and R_OAddress. Essentially, we are expanding the various navigation properties (dot "." Expressions) into join expressions if needed.

```
SELECT p.name
FROM R_OPerson p, R_OPerson_Address pa, R_OAddress a
WHERE p.pid = pa.pid AND pa.aid = a.aid AND a.state = 'WA'
```

Note that the query is still in the object domain and in terms of the object extents.

Step 2: View Unfolding: Conversion to Store Space

Now we do view unfolding to convert the query into SQL:

```
SELECT p.name
FROM (SELECT pid , name, age FROM SPerson) p,
     (SELECT pid , aid FROM SAddress) pa,
     (SELECT aid, state FROM SAddress) a
WHERE p.pid = pa.pid AND pa.aid = a.aid AND a.state = 'WA'
```

Step 3: Query Simplification

We can now apply a series of logical transformations to simplify this query.

```
SELECT p.name
FROM SPerson p, SAddress pa, SAddress a
WHERE p.pid = pa.pid AND pa.aid = a.aid AND a.state = 'WA'
```

Now, we can eliminate the redundant self-join on the primary key of SAddress (aid) and obtain:

```
SELECT p.name
FROM SPerson p, SAddress a
WHERE p.pid = a.pid AND a.state = 'WA'
```

All of the above is fairly straightforward. We now have a query that can be sent over to SQL Server.

Compile-Time Processing for Updates

The EDP allows applications to create new objects, update them, delete them and then store these changes persistently. The OR-mapping component needs to ensure that these changes are translated correctly into backend store changes. As discussed earlier, we use Update Mapping Views that declare a table in terms of objects. By using such views, we have essentially reduced the update propagation problem to a materialized view maintenance problem where changes to base relations need to propagated to the views; in the case for UMViews, the "base relations" are objects and the "views" are the tables. By modeling the problem in this manner, we can leverage the knowledge of the view maintenance technology that has been developed in the relational database world.

Update Mapping View Generation

As in the query case, a lot of the mapping work for updates is performed at compile time. Along with the Relationally Expressed Schemas for the classes, EDM types, and tables, we generate the prescribed translations between these types and the corresponding RES constructs. We also generate the Update Mapping Views between the RES constructs of classes and EDM Types and between the RES constructs of the EDM types and store tables.

Let us understand these UMViews with the help of the Person-Address example that we have been developing. Recall the RES constructs for objects (R_OPerson, R_OAddress, R_OPerson_Address) that were constructed.

Update Mapping Views (RES of Tables in Terms of RES of Objects)

The UMView for R_OPerson is simply a projection on R_SPerson whereas R_SAddress is constructed by joining R_OAddress with the one-to-many association table—R_OPerson_Address.

```
CREATE VIEW                    CREATE VIEW R_SAddress(aid, pid, state) AS
R_SPerson (pid,                SELECT aid, pid, state
name) AS                       FROM R_OPerson_Address pa, R_OAddress a
SELECT pid, name,              WHERE pa.aid = a.aid
FROM R_OPerson
```

Prescribed Translations (RES in Terms of Objects)

We need to translate the objects into RESs so that the updates can be pushed from the object space to the RES space. We use the "o2r" function to translate the virtual memory address of an object to the pid and aid keys—in the implementation we can simply get the keys from the object's shadow state. The prescribed translation for R_OPerson is a simple projection whereas the translations for R_OAddress and R_OPerson_Address are achieved by performing a join between a person and its addresses.

```
CREATE PRESCRIBED VIEW         CREATE PRESCRIBED VIEW
R_OPerson (name, pid) AS       R_OAddress(state, aid) AS
SELECT name, pid               SELECT a.state, a.aid
FROM OPerson                   FROM OPerson p, p.addrs a
CREATE PRESCRIBED VIEW
R_OPerson_Address(pid, aid) AS
SELECT p.pid, a.aid
FROM OPerson p, p.addrs a
```

Composed Update Mapping Views

We compose the above views (and with some simplification) to get the following composed update mapping views:

```
CREATE VIEW SPerson    CREATE VIEW SAddress(aid, pid, state) AS
(pid, name) AS         SELECT a.aid, p.pid, a.state
SELECT pid, name       FROM OPerson p, p.addrs a
FROM OPerson
```

Thus, the table SPerson can be expressed as a simple projection on OPerson whereas SAddress is obtained by joining a OPerson with its addresses.

Delta Expression Generation

When an application asks its object changes be saved to the backend, embodiments may translate these changes to the backend store, i.e., may generate delta expressions for the tables (views) in terms of the delta expressions of the objects (base relations). This is the area where the breakdown of the view-generation/compilation process into the RES constructs really helps. The delta expressions for the non-prescribed mappings can be generated with relative ease since these mappings are in the relational space (RESs are purely relational) and a lot of work in relational databases has been done to achieve this goal. For example, in the database literature, delta expression rules have been developed for views that are expressed in terms of relational operators such as selections, projections, inner or outer or semi-joins, unions, intersections, and differences. For the non-relational constructs, all we need to do is to design prescribed delta expressions that convert the non-relational constructs to/from the RES space.

Let us understand the delta expressions with our Person example. Consider the case where an RES construct (e.g., R_SAddress) is expressed as a join of two object collections (R_OAddress and R_OPerson_Address). The delta expression for such a view can be obtained using the following rules (suppose that the join view is V=R JOIN S):

$$i(V) = [i(R) \text{ JOIN } S^{new}] \text{ UNION } [i(S) \text{ JOIN } R^{new}]$$
$$d(V) = [d(R) \text{ JOIN } S] \text{ UNION } [d(S) \text{ JOIN } R]$$

In this expression, $i(X)$ and $d(X)$ denote the inserted and deleted tuples for the relation or view X and $R^{new}$ denotes the new value of the base relations R after all its updates have been applied.

Thus, to facilitate updates at runtime, one exemplary embodiment may first generate the following delta expressions at compile-time:

1. Prescribed delta change expressions 1803 for RES relations 1811 in terms of delta change expressions for groups of updated object collections 1801, e.g., i(R_OPerson) in terms of i(OPerson).

2. Prescribed delta change expressions 1804 for tables 1802 in terms of delta change expressions for RES relations 1812, e.g., i(SPerson) in terms of i(R_-SPerson).

3. Delta expressions 1813 for RES relations of tables expressed in terms of delta expressions of RES relations of objects, e.g., i(R_SPerson) in terms of i(R_OPerson).

Figure 18:
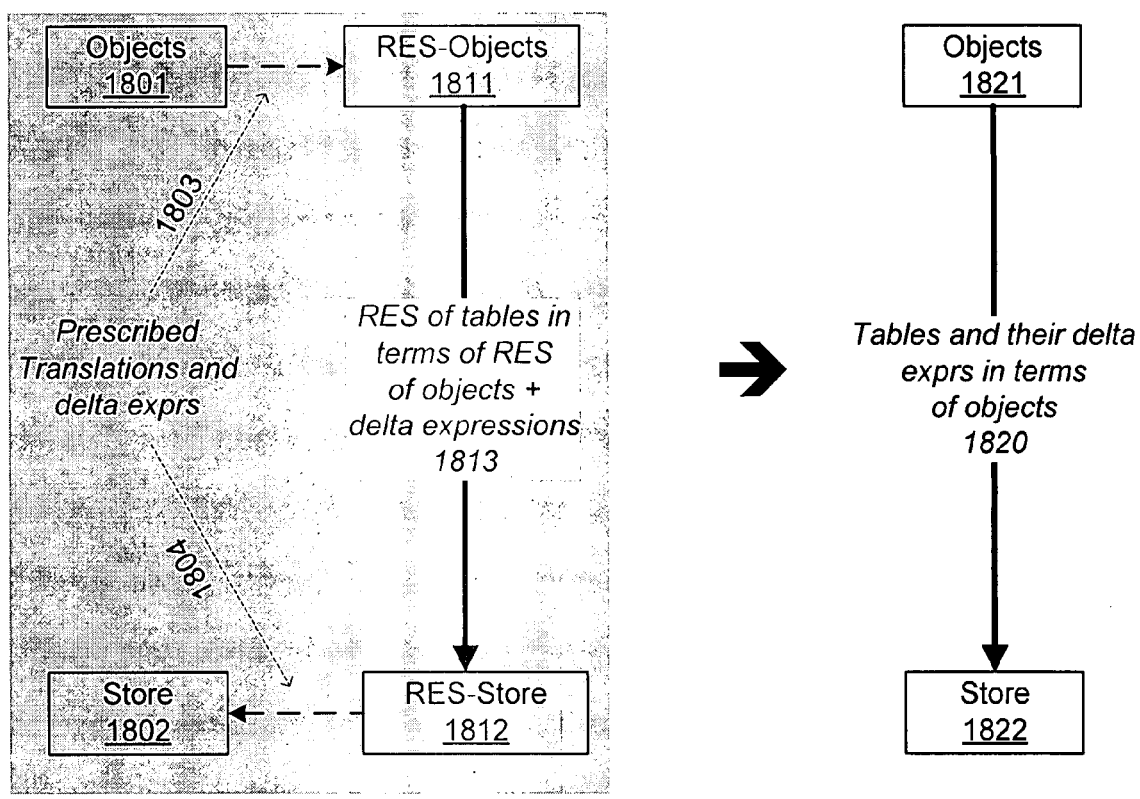
FIG. 18 illustrates composing a variety of delta expressions to obtain a delta expression for tables in terms of delta expressions for objects.

We can compose (1), (2), and (3) to obtain a delta expression 1820 for tables 1822 (e.g. SPerson) in terms of delta expressions for objects 1821 (e.g., OPerson). This composition is illustrated in FIG. 18. Thus, as in the case of queries, at compile time, we now have a direct translation from objects to tables. In the case of updates, we have really leveraged the RES breakdown to generate the delta expressions (for the QMViews, this advantage is applicable for notifications).

Note that there need not be delta expressions for updates—as we will see later, model updates can be modeled by placing them in the insert and delete set; a post-processing step later reconverts them back into updates before the changes are actually applied to the database. One reason for this approach is that the existing work on incremental view maintenance does not typically have delta expressions for updates. Alternative, more complex embodiments in which such expressions are developed are feasible.

After the view composition has been performed, the delta expressions for the tables may be purely in terms of the object collections and insert and delete sets of objects, e.g., i(SPerson) is terms of OPerson, i(OPerson), and d(OPerson). Some of these delta expressions may need object collections to be computed, e.g., i(OPerson) needs EPerson for its computation. However, the whole collection may not be cached at the EDP client (or we may want to run the operation on the most consistent and latest value of the collection). To address this problem, we unfold the object collections using the corresponding Query Mapping Views, e.g., we use the QMView for OPerson and express it in terms of SPerson and other relations if needed. Thus, in one embodiment, at the end of the compilation process, all delta expressions for SPerson are expressed in terms of i(OPerson), d(OPerson), and the relation SPerson itself—at runtime, given the insert and delete sets of OPerson, we can now generate the relevant SQL statements that can be executed at the server.

In summary, given the QMViews and UMViews between RES constructs of tables and objects and the prescribed translations between these constructs and the tables/objects, the following exemplary steps may be carried out:

1. Generate the delta expressions mentioned in steps 1, 2, and 3 above.

2. Compose these expressions such that we have delta expressions for the tables (SPerson) in terms of delta expressions of the objects (OPerson) and the object collections themselves.

3. Unfold the object collections using their QMViews to obtain delta expressions for tables (SPerson) in terms of the delta expressions of the objects and the tables themselves, i.e., object collections are eliminated. Special cases may exist that allow embodiments to avoid this unfolding or know that the whole collection is cached at the client.

4. Simplify/optimize the expression so that it reduces the runtime work.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed:

1. A method for providing data services to an application, comprising acts of:
   providing data services by a computing platform, which allow an application to access and update data in a database, wherein providing data services comprises:
      generating a query view that expresses at least a portion of an application schema associated with said application in terms of a database schema associated with said database;
      generating an update view that expresses at least a portion of said database schema in terms of said application schema;
      in response to a query request from the application requesting access to data, processing the query request by utilizing said query view to query said database on behalf of said requesting application;
      in response to an update request from the application requesting an update to data, processing the update request by utilizing said update view to update said database on behalf of said requesting application.

2. The method of claim 1, further comprising receiving, from said requesting application, an object in a programming language, said object in a programming language comprising data for use in updating said database.

3. The method of claim 1, further comprising receiving, from said requesting application, a create, insert, update, or delete instruction, said create, insert, update, or delete instruction comprising data for use in updating said database.

4. The method of claim 1, further comprising receiving, from said requesting application, an expression in a Data Manipulation Language (DML), said expression comprising data for use in updating said database.

5. The method of claim 1, wherein utilizing said update view to update said database comprises applying a view maintenance algorithm to said update view.

6. The method of claim 5, wherein applying a view maintenance algorithm to said update view produces a delta expression for said update view, and further comprising using view unfolding to combine said delta expression with a query view.

7. The method of claim 1, wherein utilizing said update view to update said database comprises applying a view maintenance algorithm to data received for use in updating said database.

8. The method of claim 1, wherein said application schema supports classes, relationships, inheritance, aggregation, and complex types.

9. The method of claim 1, wherein said query view and update view are generated from a mapping that correlates portions of said application schema to portions of said database schema.

10. The method of claim 9, wherein said mapping is represented in terms of queries on the application schema and database schema, and wherein said mapping is automatically compiled to generate said query view and said update view as bidirectional views.

11. A computer readable storage medium having stored thereon a plurality of computer executable instructions that are executable by a computer to implement a data access system for providing data services to an application, the computer executable instructions comprising:
   computer executable instructions for generating a query view that expresses at least a portion of an application schema associated with said application in terms of a database schema associated with a database;
   computer executable instructions for generating an update view that expresses at least a portion of said database schema in terms of said application schema;
   computer executable instructions for processing a query request from the application requesting access to data by utilizing said query view to query said database on behalf of said requesting application; and
   computer executable instructions for processing an update request from the application requesting an update to data by utilizing said update view to update said database on behalf of said requesting application.

12. The computer readable storage medium of claim 11, further comprising computer executable instructions for receiving, from said requesting application, an object in a programming language, said object in a programming language comprising data for use in updating said database.

13. The computer readable storage medium of claim 11, further comprising computer executable instructions for receiving, from said requesting application, a create, insert, update, or delete instruction, said create, insert, update, or delete instruction comprising data for use in updating said database.

14. The computer readable storage medium of claim 11, further comprising computer executable instructions for receiving, from said requesting application, an expression in a Data Manipulation Language (DML), said expression comprising data for use in updating said database.

15. The computer readable storage medium of claim 11, wherein said computer executable instructions for utilizing said update view to update said database applies a view maintenance algorithm to said update view.

16. The computer readable storage medium of claim 15, wherein applying a view maintenance algorithm to said update view produces a delta expression for said update view, and further comprising computer executable instructions for using view unfolding to combine said delta expression with a query view.

17. The computer readable storage medium of claim 11, wherein said computer executable instructions for utilizing the update view to update said database applies a view maintenance algorithm to data received for use in updating said database.

18. The computer readable storage medium of claim 11, wherein said application schema supports classes, relationships, inheritance, aggregation, and complex types.

19. The computer readable storage medium of claim 11, further comprising computer executable instructions for generating a mapping that correlates portions of said application schema to portions of said database schema, and processing said mapping to generate said query view and update view based on said mapping.

20. The computer readable storage medium of claim 19, wherein said query view and said update view are automatically generated as bidirectional views using said mapping.

* * * * *